US012501503B2

(12) United States Patent
Yi et al.

(10) Patent No.: US 12,501,503 B2
(45) Date of Patent: *Dec. 16, 2025

(54) ENHANCED MULTI-ACCESS PROTOCOL DATA UNIT (PDU) SESSION

(71) Applicant: CABLE TELEVISION LABORATORIES, INC., Louisville, CO (US)

(72) Inventors: Yunjung Yi, Louisville, CO (US); Sundar R. Sriram, Aurora, IL (US)

(73) Assignee: Cable Television Laboratories, Inc., Louisville, CO (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/953,975

(22) Filed: Sep. 27, 2022

(65) Prior Publication Data
US 2023/0108625 A1      Apr. 6, 2023

Related U.S. Application Data

(60) Provisional application No. 63/248,864, filed on Sep. 27, 2021.

(51) Int. Cl.
*H04W 76/15*  (2018.01)
*H04W 88/06*  (2009.01)

(52) U.S. Cl.
CPC ............ *H04W 76/15* (2018.02); *H04W 88/06* (2013.01)

(58) Field of Classification Search
CPC ..... H04W 76/11; H04W 76/12; H04W 76/15; H04W 76/25; H04W 48/18;
(Continued)

(56) References Cited

U.S. PATENT DOCUMENTS 11,160,125 B2 *  10/2021  Qiao ..................... H04W 76/12
11,160,126 B2 *  10/2021  Qiao ..................... H04W 76/12
(Continued)

FOREIGN PATENT DOCUMENTS

CN      114339847 A  *  4/2022  ........... H04W 76/10
CN      116648990 A  *  8/2023  ........... H04W 76/15
(Continued)

OTHER PUBLICATIONS

V. Y. H. Kueh, R. Tafazolli and B. Evans, "Performance evaluation of SIP-based session establishment over satellite-UMTS," The 57th IEEE Semiannual Vehicular Technology Conference, 2003. VTC 2003—Spring., Jeju, Korea (South), 2003, pp. 1381-1385 vol.2 , doi: 10.1109/VETECS.2003.1207855. (Year: 2003).*

*Primary Examiner* — William D Cumming
(74) *Attorney, Agent, or Firm* — Polsinelli PC

(57) ABSTRACT

Some examples for protocol data unit (PDU) session establishment include sending a first PDU session establishment request to a first network The first PDU session establishment request is sent via an access network. A second PDU session establishment request is sent to a second network via the access network A first acknowledgement corresponding to the first PDU session establishment request is received via the access network, and a second acknowledgement corresponding to the second PDU session establishment request is received via the access network.

20 Claims, 12 Drawing Sheets

(58) Field of Classification Search
CPC ... H04W 60/005; H04W 76/16; H04W 76/30; H04W 60/06; H04W 40/246
USPC .......................................... 370/254, 328, 329
See application file for complete search history.

(56) References Cited

U.S. PATENT DOCUMENTS

| | | | | |
|---|---|---|---|---|
| 11,528,763 | B2* | 12/2022 | Youn | H04W 76/30 |
| 11,778,677 | B2* | 10/2023 | Qiao | H04W 76/15 370/254 |
| 11,785,662 | B2* | 10/2023 | Prakash | H04L 67/145 455/414.1 |
| 11,838,971 | B2* | 12/2023 | Qiao | H04W 76/12 |
| 12,069,758 | B2* | 8/2024 | Youn | H04W 48/16 |
| 12,120,775 | B2* | 10/2024 | Talebi Fard | H04W 28/0268 |
| 2017/0251368 | A1 | 8/2017 | Ross et al. | |
| 2019/0306752 | A1 | 10/2019 | Lai | |
| 2020/0359439 | A1* | 11/2020 | Qiao | H04W 40/246 |
| 2020/0359440 | A1* | 11/2020 | Qiao | H04W 76/11 |
| 2021/0037585 | A1* | 2/2021 | Youn | H04W 60/06 |
| 2022/0053603 | A1* | 2/2022 | Talebi Fard | H04W 76/11 |
| 2022/0086938 | A1* | 3/2022 | Qiao | H04W 76/15 |
| 2022/0086939 | A1* | 3/2022 | Qiao | H04W 76/11 |
| 2022/0167446 | A1* | 5/2022 | Youn | H04W 76/16 |
| 2022/0240222 | A1 | 7/2022 | Youn et al. | |
| 2022/0264370 | A1 | 8/2022 | Qiao et al. | |
| 2022/0279384 | A1 | 9/2022 | Sugawara | |
| 2023/0010391 | A1* | 1/2023 | Prakash | H04W 76/25 |
| 2023/0078760 | A1* | 3/2023 | Yi | H04W 60/005 370/328 |
| 2023/0108625 | A1* | 4/2023 | Yi | H04W 76/15 370/328 |
| 2023/0156831 | A1* | 5/2023 | Zhang | H04W 76/12 370/329 |
| 2023/0232366 | A1* | 7/2023 | Li | H04W 68/00 455/435.1 |
| 2023/0328821 | A1* | 10/2023 | Talebi Fard | H04W 76/11 370/329 |
| 2024/0080923 | A1* | 3/2024 | Qiao | H04W 76/12 |
| 2024/0098806 | A1* | 3/2024 | Dimitrovski | H04W 76/10 |
| 2024/0107602 | A1* | 3/2024 | Conceicao | H04W 72/25 |
| 2024/0179774 | A1* | 5/2024 | Qiao | H04W 76/12 |

FOREIGN PATENT DOCUMENTS

| | | | | |
|---|---|---|---|---|
| EP | 4210426 A1 | * | 7/2023 | ............ H04W 76/15 |
| WO | WO-2022067730 A1 | * | 4/2022 | ............ H04W 76/15 |
| WO | WO-2022086138 A1 | * | 4/2022 | ............ H04W 80/06 |

* cited by examiner

ENHANCED MULTI-ACCESS PROTOCOL DATA UNIT (PDU) SESSION

CROSS-REFERENCE TO RELATED APPLICATION

This application claims priority under 35 U.S.C. § 119 to U.S. Provisional Patent Application No. 63/248,864, filed Sep. 27, 2021, the entirety of which is incorporated herein by reference.

BACKGROUND

A wireless device may be connected or equipped with two subscriber identification modules (SIM)s, which may be associated with one or more networks (e.g., Public Land Mobile Network (PLMN)s). For example, a first SIM may be used to connect to a first PLMN and a second SIM may be used to connect to a second PLMN. In some aspects, each PLMN may include a user plane function (UPF) component at which access traffic steering, switching, and splitting (ATSSS) may be implemented. ATSSS facilitates steering of traffic between a cellular and non-cellular access. For instance, a good quality network for data flow may be selected and used. ATSSS may also facilitate switching (e.g., seamless handover) to or from the cellular and the non-cellular access, as well as splitting (e.g., network aggregation) of data traffic across the cellular and the non-cellular access. A cellular access may be referred as 3GPP access. A non-cellular access may be referred as non-3GPP access.

It is with these observations in mind, among others, that the presently disclosed technology was conceived.

BRIEF SUMMARY

The aforementioned problems can be addressed using the systems, methods, and devices disclosed herein. For instance, a method can include sending, by a wireless device with a plurality of subscriber identify modules (SIMs), a first protocol data unit (PDU) session establishment request to a first session management function (SMF) component of a first network, wherein: the first PDU session establishment request is based on a first SIM of the plurality of SIMs; and the first PDU session establishment request is sent to the first SMF via an access network; sending, by the wireless device, a second PDU session establishment request to a second SMF of a second network via the access network, wherein the second PDU session establishment request is based on a second SIM of the plurality of SIMs; receiving, via the access network, a first acknowledgement corresponding to the first PDU session establishment request; and receiving, via the access network, a second acknowledgement corresponding to the second PDU session establishment request.

The access network may be a non-cellular access, a non-3GPP access, a cellular access or a 3GPP access. The non-cellular access or the non-3GPP access may comprise enterprise access, public/private WiFi network, Cable network, digital subscriber line (DSL), fiber to home access, wireline, and/or the like. The cellular access or the 3GPP access may comprise new radio (NR) or long term evolution (LTE) or high speed packet access (HSPA) or Global System for Mobile Communications (GSM). A first identifier of the first PDU session may be equal to a second identifier of the second PDU session.

Another example method may include sending, by a wireless device with a plurality of subscriber identify modules (SIMs), a first protocol data unit (PDU) session establishment request to a first session management function (SMF) component of a first network, wherein: the first PDU session establishment request comprising a first PDU identifier is based on a first SIM of the plurality of SIMs; and the first PDU session establishment request is sent to the first SMF via an access network, the access network being a non cellular access; sending, by the wireless device, a second PDU session establishment request a second PDU identifier to a second SMF of a second network via the access network; receiving, via the access network, a first acknowledgement corresponding to the first PDU session establishment request; and receiving, via the access network, a second acknowledgement corresponding to the second PDU session establishment request. The first PDU identifier may be equal to or different from the second PDU identifier.

Another example method may include receiving, from a wireless device with a plurality of SIMs, a first PDU session establishment request for establishing of a first PDU session with a first network, wherein: the first PDU session establishment request is based on a first SIM of the plurality of SIMs; and the first PDU session establishment request is received via an access network; receiving, from the wireless device, a second PDU session establishment request for establishing of a second PDU session with a second network; wherein: the second PDU session establishment request is based on a second SIM of the plurality of SIMs; and the second PDU session establishment request being received via the access network; sending, via the access network and to the wireless device, a first acknowledgement corresponding to the first PDU session establishment request; and sending, via the access network and to the wireless device, a second acknowledgement corresponding to the second PDU session establishment request.

Another example method may include receiving, a method can include sending, by a wireless device, a first protocol data unit (PDU) session establishment request to a first network via an access network; sending, by the wireless device, a second PDU session establishment request to a second network via the access network; receiving, via the access network, a first acknowledgement corresponding to the first PDU session establishment request; and receiving, via the access network, a second acknowledgement corresponding to the second PDU session establishment request.

In the example, the wireless device may be equipped with a plurality of subscriber identify modules (SIMs). In the example, the first PDU session establishment may be sent to a first SMF of the first network. The second PDU session establishment may be sent to a second SMF of the network. In the example, the first PDU session establishment request may be sent based on a first SIM of the plurality of the SIMs. The second PDU session establishment request may be sent based on a second SIM of the plurality of the SIMs. In the example, the second PDU session establishment request may be sent during the first PDU session establishment request being sent. In the example, the second PDU session establishment request may be sent while the first PDU session is not released.

The access network may be a non-cellular access, a non-3GPP access, a cellular access or a 3GPP access. The non-cellular access or the non-3GPP access may comprise enterprise access, public/private WiFi network, Cable network, digital subscriber line (DSL), fiber to home access, wireline, and/or the like. The cellular access or the 3GPP access may comprise new radio (NR) or long term evolution (LTE) or high speed packet access (HSPA) or Global System for Mobile Communications (GSM). A first identifier of the first PDU session may be equal to a second identifier of the second PDU session.

Another example method may include receiving, at a first SMF component of a first network, a PDU session establishment request from a wireless device, wherein the PDU session establishment request indicates that an anchor network of the PDU session is a second network; determining a second SMF of the second network in response to the anchor network being the second network; sending, to the second SMF, a forwarded request associated with the PDU session establishment request; receiving a response to the forwarded request from the second SMF; and transmitting, to the wireless device, a response to the PDU session establishment request based on receiving the response to the forwarded request from the second SMF.

Some aspects provide an apparatus for wireless communication. The apparatus may include a memory and one or more processors coupled to the memory. The one or more processors may be configured to perform: sending, by a wireless device with a plurality of SIMs, a first PDU session establishment request to a first SMF component of a first network, wherein: the first PDU session establishment request is based on a first SIM of the plurality of SIMs; and the first PDU session establishment request is sent to the first SMF via an access network, the access network being a non-cellular access network; sending, by the wireless device, a second PDU session establishment request to a second SMF of a second network via the access network; receiving, via the access network, a first acknowledgement corresponding to the first PDU session establishment request; and receiving, via the access network, a second acknowledgement corresponding to the second PDU session establishment request.

Some aspects provide an apparatus for wireless communication. The apparatus may include a memory and one or more processors coupled to the memory. The one or more processors may be configured to perform: receiving, from a wireless device with a plurality of SIMs, a first PDU session establishment request for establishing of a first PDU session with a first network, wherein: the first PDU session establishment request is based on a first SIM of the plurality of SIMs; and the first PDU session establishment request is received via an access network, the access network being a non-cellular access network; receiving, from the wireless device, a second PDU session establishment request for establishing of a second PDU session with a second network, the second PDU session establishment request being received via the access network; sending, via the access network and to the wireless device, a first acknowledgement corresponding to the first PDU session establishment request; and sending, via the access network and to the wireless device, a second acknowledgement corresponding to the second PDU session establishment request.

Some aspects provide an apparatus for wireless communication. The apparatus may include a memory and one or more processors coupled to the memory. The one or more processors may be configured to perform: receiving, at a first SMF component of a first network, a PDU session establishment request from a wireless device, wherein the PDU session establishment request indicates that an anchor network of the PDU session is a second network; determining a second SMF of the second network in response to the anchor network being the second network; sending, to the second SMF, a forwarded request associated with the PDU session establishment request; receiving a response to the forwarded request from the second SMF; and transmitting, to the wireless device, a response to the PDU session establishment request based on receiving the response to the forwarded request from the second SMF.

Some aspects provide a non-transitory computer-readable medium having instructions stored thereon, that when executed by one or more processors, causes the one or more processors to perform: sending, by a wireless device with a plurality of SIMs, a first PDU session establishment request to a first SMF component of a first network, wherein: the first PDU session establishment request is based on a first SIM of the plurality of SIMs; and the first PDU session establishment request is sent to the first SMF via an access network, the access network being a non-cellular access network; sending, by the wireless device, a second PDU session establishment request to a second SMF of a second network via the access network; receiving, via the access network, a first acknowledgement corresponding to the first PDU session establishment request; and receiving, via the access network, a second acknowledgement corresponding to the second PDU session establishment request.

Some aspects provide a non-transitory computer-readable medium having instructions stored thereon, that when executed by one or more processors, causes the one or more processors to perform: receiving, from a wireless device with a plurality of SIMs, a first PDU session establishment request for establishing of a first PDU session with a first network, wherein: the first PDU session establishment request is based on a first SIM of the plurality of SIMs; and the first PDU session establishment request is received via an access network, the access network being a non-cellular access network; receiving, from the wireless device, a second PDU session establishment request for establishing of a second PDU session with a second network, the second PDU session establishment request being received via the access network; sending, via the access network and to the wireless device, a first acknowledgement corresponding to the first PDU session establishment request; and sending, via the access network and to the wireless device, a second acknowledgement corresponding to the second PDU session establishment request.

Some aspects provide a non-transitory computer-readable medium having instructions stored thereon, that when executed by one or more processors, causes the one or more processors to perform: receiving, at a first SMF component of a first network, a PDU session establishment request from a wireless device, wherein the PDU session establishment request indicates that an anchor network of the PDU session is a second network; determining a second SMF of the second network in response to the anchor network being the second network; sending, to the second SMF, a forwarded request associated with the PDU session establishment request; receiving a response to the forwarded request from the second SMF; and transmitting, to the wireless device, a response to the PDU session establishment request based on receiving the response to the forwarded request from the second SMF.

The foregoing summary is intended to be illustrative and is not meant in a limiting sense. Many features of the embodiments may be employed with or without reference to other features of any of the embodiments. Additional aspects, advantages, and/or utilities of the presently disclosed technology will be set forth in part in the description that follows and, in part, will be apparent from the description, or may be learned by practice of the presently disclosed technology.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the disclosed subject matter. It should be understood, however, that the disclosed subject matter is not limited to the precise embodiments and features shown. The accompanying drawings, which are incorporated in and constitute a part of this specification, illustrate an implementation of systems, methods, and devices consistent with the disclosed subject matter and, together with the description, serves to explain advantages and principles consistent with the disclosed subject matter.

DETAILED DESCRIPTION

Figure 1:
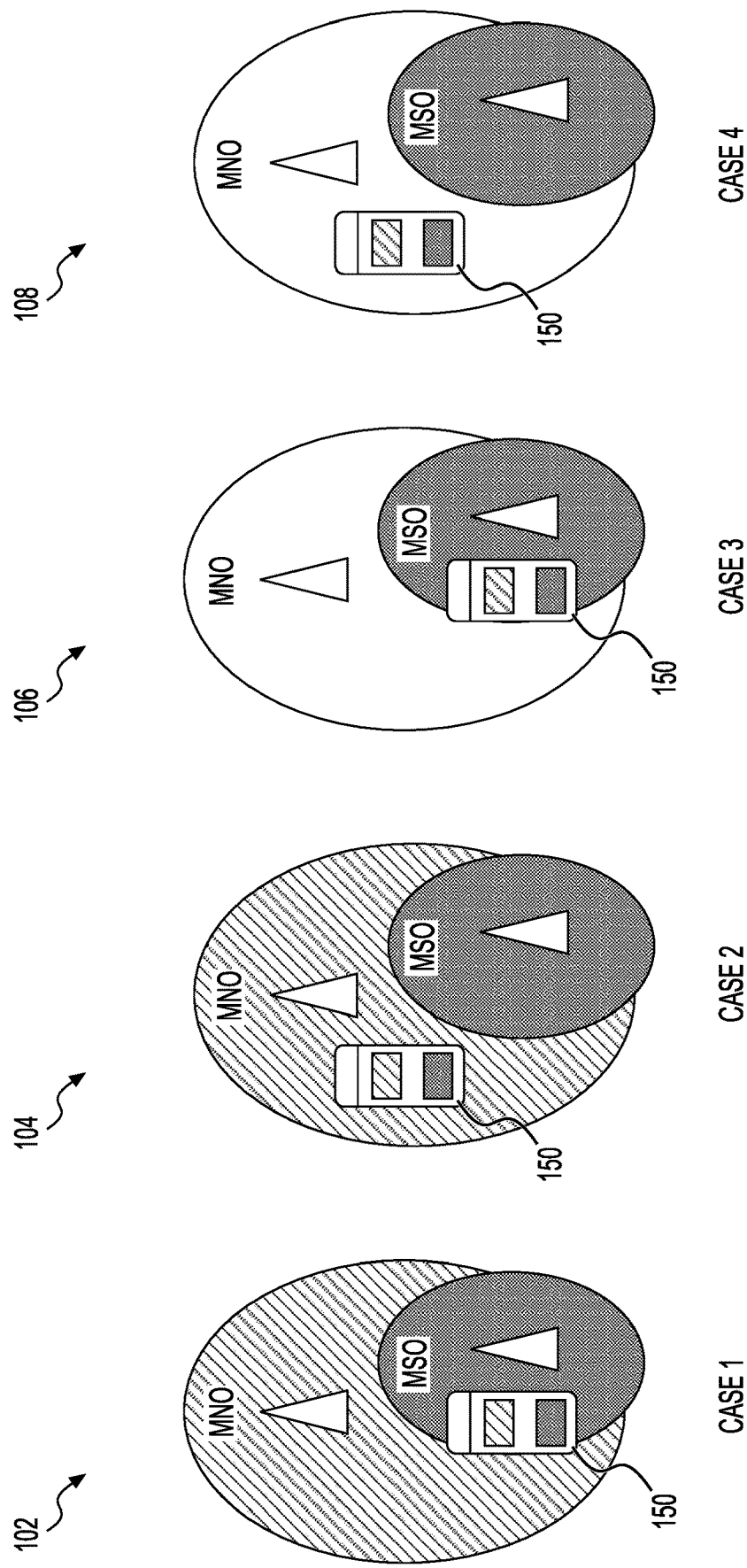
FIG. 1 illustrates various scenarios associated with a wireless device, in accordance with certain aspects of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

1. Terminology

The phraseology and terminology employed herein are for the purpose of description and should not be regarded as limiting. For example, the use of a singular term, such as, "a" is not intended as limiting of the number of items. Further, it should be understood that any one of the features of the presently disclosed technology may be used separately or in combination with other features. Other systems, methods, features, and advantages of the presently disclosed technology will be, or become, apparent to one with skill in the art upon examination of the figures and the detailed description. It is intended that all such additional systems, methods, features, and advantages be included within this description, be within the scope of the presently disclosed technology, and be protected by the accompanying claims.

Further, as the presently disclosed technology is susceptible to embodiments of many different forms, it is intended that the present disclosure be considered as an example of the principles of the presently disclosed technology and not intended to limit the presently disclosed technology to the specific embodiments shown and described. Any one of the features of the presently disclosed technology may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the presently disclosed technology may include a variety of combinations and/or integrations of the embodiments described herein. Additionally, all aspects of the present disclosure, as described herein, are not essential for its practice. Likewise, other systems, methods, features, and advantages of the presently disclosed technology will be, or become, apparent to one with skill in the art upon examination of the figures and the description. It is intended that all such additional systems, methods, features, and advantages be included within this description, be within the scope of the presently disclosed technology, and be encompassed by the claims.

Any term of degree such as, but not limited to, "substantially," as used in the description and the appended claims, should be understood to include an exact, or a similar, but not exact configuration. The terms "comprising," "including" and "having" are used interchangeably in this disclosure. The terms "comprising," "including" and "having" mean to include, but not necessarily be limited to the things so described.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C; "A, B and C." An exception to this definition will occur only when a combination of elements, functions, steps or acts are in some way inherently mutually exclusive.

When a wireless device is equipped with dual subscriber identification module (SIM), for example, a first phone number via mobile network operator (MNO) network and a second phone number via multi-system operation (MSO) network, the wireless device may be able to receive a voice call via the MNO network while the wireless device receives data via the MSO network. An MSO may refer to a company that offers multiple services beyond television broadcast. MSOs may offer internet and telephone service alongside cable television. An MSO may include a cable company offering telecommunication services, or a telecommunications company offering cable services.

In some aspects, a wireless device may initiate a first PDU session via the MNO network that is corresponding to a voice call. The wireless device may initiate a second PDU session via the MSO network that is corresponding to data session. There are different cases that the wireless device may encounter.

FIG. 1 illustrates various scenarios associated with a wireless device, in accordance with certain aspects of the present disclosure. As shown, in a first scenario 102 (e.g., case 1), the wireless device 150 is active/connected via an MNO network and via an MSO network, and the wireless device is in coverage of the MSO access network. The wireless device 150 supports "dual active" capability in this case. In a second scenario 104 (e.g., case 2), the wireless device 150 is active/connected via the MNO network and via the MSO network. The wireless device 150 may be outside of coverage of the MSO access network. The wireless device 150 may support "dual active" capability in this case. In a third scenario 106 (e.g., case 3), the wireless device is not active via the MNO network and is active/connected via the MSO network. The wireless device is in coverage of the MSO access network. The wireless device 150 may or may not support "dual active" capability in this case. In a fourth scenario 108 (e.g., case 4), the wireless device is not active/connected via MNO network and is active/connected via MSO network, and the wireless device 150 is outside of the coverage of MSO access network. The wireless device 150 may or may not support 'dual active' capability in this case.

A base station of the radio access network of an MNO network may be referred as base station 1 (BS1) of radio access technology 1 (RAT1). A base station of radio access network of an MSO network may be referred as base station 2 (BS2) of radio access technology 2 (RAT2). RAT1 may be a new radio (NR). RAT1 may be long-term evolution (LTE). RAT1 may be a non-cellular access such as wireless local area network (WLAN). As used herein, non-cellular access may refer to a non-third generation partnership project (3GPP) access, and cellular access may refer to 3GPP access. RAT1 may be a wired network such as cable modem or a router/bridge connecting to optical network or coax. RAT2 may be a new radio (NR). RAT2 may be long term evolution (LTE). RAT2 may be a non-3GPP access such as wireless local area network (WLAN). RAT2 may be a wired network such as cable modem or a router/bridge connecting to optical network or coax.

SIM1 of a wireless device may be referred to as wireless device SIM1 (W-SIM1). SIM2 of a wireless device may be referred to as wireless device SIM2 (W-SIM2). For example, a wireless device may be connected to an MNO network directly via a first SIM (e.g., SIM1). The wireless device may be connected to an MSO network directly via a second SIM (e.g., SIM2). The wireless device may be connected to the MNO network indirectly via the second SIM. The wireless device of SIM2 (W-SIM2) may be connected to the MNO network indirectly when the W-SIM2 is registered/connected to a base station (or an access network) of the MNO network while access and mobility management function (AMF) and/or user plane function (UPF) and/or session management function (SMF) for the wireless device of SIM2 resides in core network of the MSO (or different network from MNO network).

In some cases, when a wireless device is equipped with dual or multiple SIMs, perhaps registered via multiple networks, current 3GPP architectures may allow the non-3GPP access network to be registered via a public land mobile network (PLMN) (e.g., one of the multiple networks). The wireless device may be registered via the non-3GPP access and via a fifth-generation core (5GC) of the PLMN. This may limit the applicability of access traffic steering, switching and splitting (ATSSS) between a 3GPP access and the non-3GPP access via first and second PLMNs. For example, the wireless device may be registered via a first PLMN and a first SIM. Moreover, the wireless device may be registered via the second PLMN via a second SIM. This scenario may result in ATSSS not being applied between the 3GPP access of the second PLMN and the non-3GPP access (e.g., of the first PLMN). ATSSS is a service that allows traffic steering, switching, or splitting between a 3GPP connection and a non-3GPP connection. ATSSS functions in the user-plane function (UPF) of the network, as described in more detail herein.

When a wireless device is equipped with multi-SIM capability, with current/existing technologies, the wireless device may receive or may be allowed to or may be associated with the non-3GPP access via a single anchor network. The anchor network may be a network with a primary session anchor UPF (e.g., at which ATSSS is implemented). For example, the wireless device may establish a first PDU session via the first SIM via the first PLMN. The wireless device may also establish a second PDU session via the second SIM via the second PLMN. The first PDU may be established via a multi-access (MA)-PDU across the first PLMN and the second PLMN using 3GPP access and non-3GPP access. The second PDU may not, based on existing/current technologies, be established via a second MA-PDU session across the first PLMN and the second PLMN using 3GPP access and non-3GPP access. Furthermore, even when the first PLMN and the second PLMN are the same, the wireless device may not establish two MA-PDU sessions sharing the non-3GPP access via two 3GPP access networks. This may be undesirable for example, when a wireless device is equipped with two SIMs for the same operator as it may prevent data offloading in each SIM. The first SIM of the wireless device may be mainly for personal use and the second SIM of the wireless device may be mainly for business. The non-3GPP access may not be utilized for both SIMs.

Certain aspects of the present disclosure enable sharing of a non-3GPP access associated/used with multiple 3GPP accesses. For example, when a wireless device is equipped with multiple SIMs, one or more PDUs of the wireless device may be supported via the non-3GPP access and the multiple 3GPP accesses. Some aspects of the present disclosure provide techniques for PDU session establishment for multiple PLMNs by sharing a non-3GPP access node. The techniques described herein also allow for using an ATSSS function in both PLMNs. Thus, when a wireless device is equipped with dual or multiple SIMs, the wireless device may be able to be connected/registered via one or more PLMNs via two or more access networks. The one or more access networks may be 3GPP access networks, for example, LTE/fourth-generation (4G) radio access network (RAN) and/or fifth-generation (5G)/new radio (NR) RAN. The wireless device may also be equipped with one or more non-3GPP access networks (e.g., wireless local area network (WLAN), a wired network, an optical network, digital subscriber line (DSL), cable, coax, and/or the like). A non-3GPP access network may support either trusted access or untrusted access. A list of PLMNs supporting trusted access may include 5GC, evolved packet core (EPC), or 5GC without non-access stratum (NAS).

Figure 2:
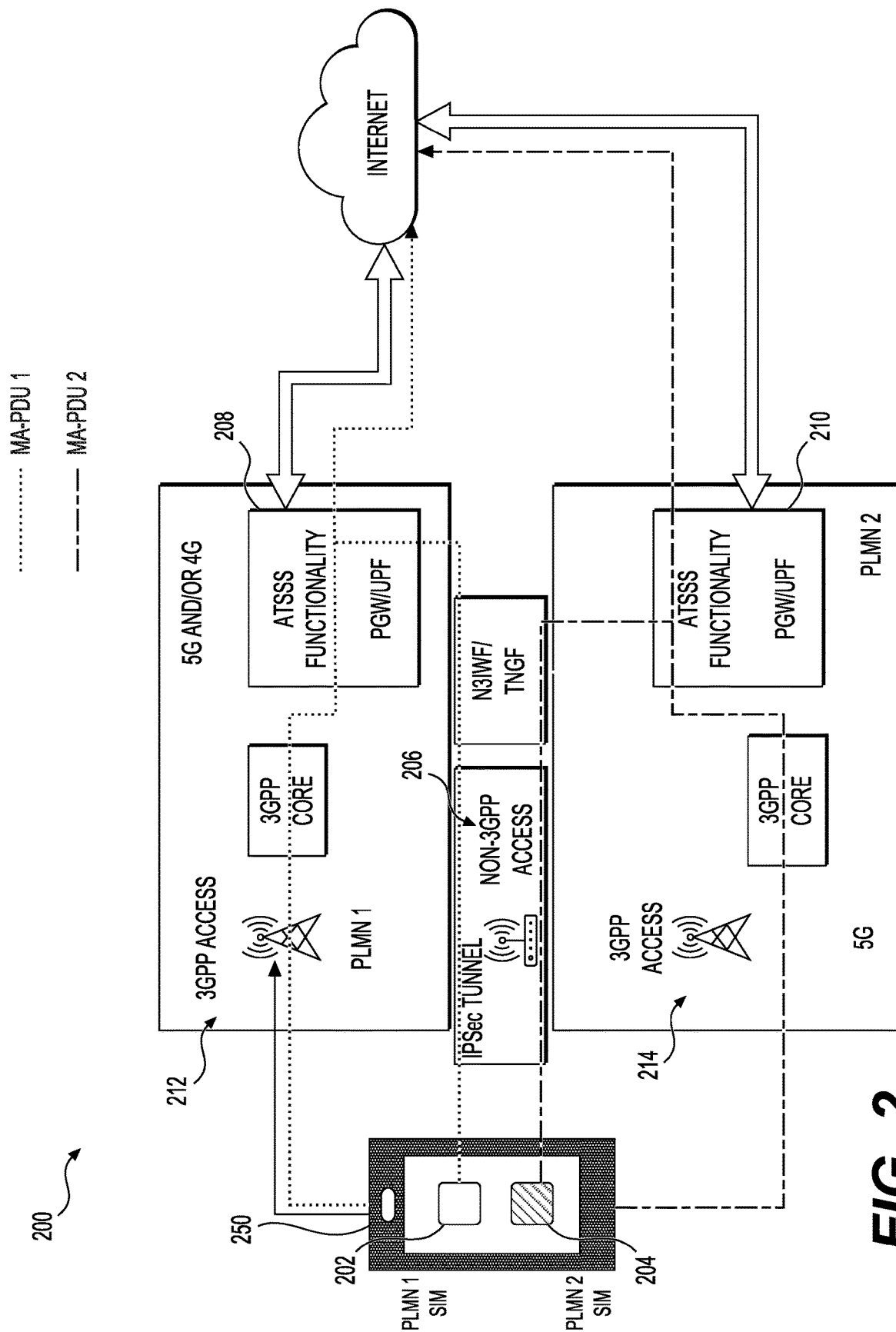
FIG. 2 illustrates an example communication system for protocol data unit (PDU) establishment using non-cellular access, in accordance with certain aspects of the present disclosure.

FIG. 2 illustrates an example communication system 200 for PDU establishment using non-3GPP access, in accordance with certain aspects of the present disclosure. As shown, a shared non-3GPP interworking function (N3IWF)/ trusted non-3GPP gateway function (TNGF)/wireline access gateway function (W-AGF) between two 5G networks may be used. While some examples provided herein are described with respect to 4G and/or 5G to facilitate understanding, the aspects of the present disclosure may be applied for any radio access technology or technologies.

As shown, the wireless device 250 (e.g., corresponding to wireless device 150 of FIG. 1) may include a first SIM 202 and a second SIM 204. The wireless device 250 may be a multi-SIM and ATSSS capable user equipment (UE). As shown, the wireless device 250 may register for internet communication via 5GC of PLMN1 and 5GC of PLMN2, using a shared access node (AN) 206. In other words, SIM 202 may register via 5GC of PLMN1 using the AN 206, and SIM 204 may register via 5GC of PLMN2 using the AN 206. The AN may provide a secure internet protocol (IP) session (IPSec) tunnel for the registration of both SIMs 202, 204. As shown, a single N3IWF may be connected to both 5GC networks (e.g., both PLMN1 and PLMN2) including 3GPP access (e.g., 3GPP access 212 of PLMN1 and 3GPP access 214 of PLMN2). The N3IWF may provide one active non-3GPP connection or two active non-3GPP connections. The techniques described with respect to FIG. 2 may be used for both dual SIM dual standby implementations and dual SIM dual active implementations. While certain examples provided herein are described with respect to an access network being a non-cellular or non-3GPP network to facilitate understanding, the aspects of the present disclosure may be implemented with a 3GPP access network. For instance, the access network may be a non-cellular access, a non-3GPP access, a cellular access or a 3GPP access. The non-cellular access or the non-3GPP access may include enterprise access, public/private WiFi network, Cable network, digital subscriber line (DSL), fiber to home access, wireline, and/or the like. The cellular access or the 3GPP access may include new radio (NR) or long term evolution (LTE) or high speed packet access (HSPA) or Global System for Mobile Communications (GSM).

A N3IWF/TNGF/W-AGF network function may be shared between the first 5G network (e.g., PLMN1) and the second 5G network (e.g., PLMN2), as described. The N3IWF/TNGF/W-AGF may be associated with the first 5G network at a first time. The N3IWF/TNGF/W-AGF may be associated with the second 5G network at a second time. As shown, each of PLMN1 and PLMN2 may include ATSSS functionality at a packet gateway (PGW)/UPF 208, 210, respectively. The ATSSS functionality may perform steering, switching, and splitting of traffic between the 3GPP access (e.g., 3GPP access 212 or 3GPP access 214) and non-3GPP access (e.g., AN 206) using anchor nodes implemented at the UPF of the respective PLMN. In some aspects of the present disclosure, the anchor node may be identified during PDU session establishment, as described in more detail herein.

Figure 3:
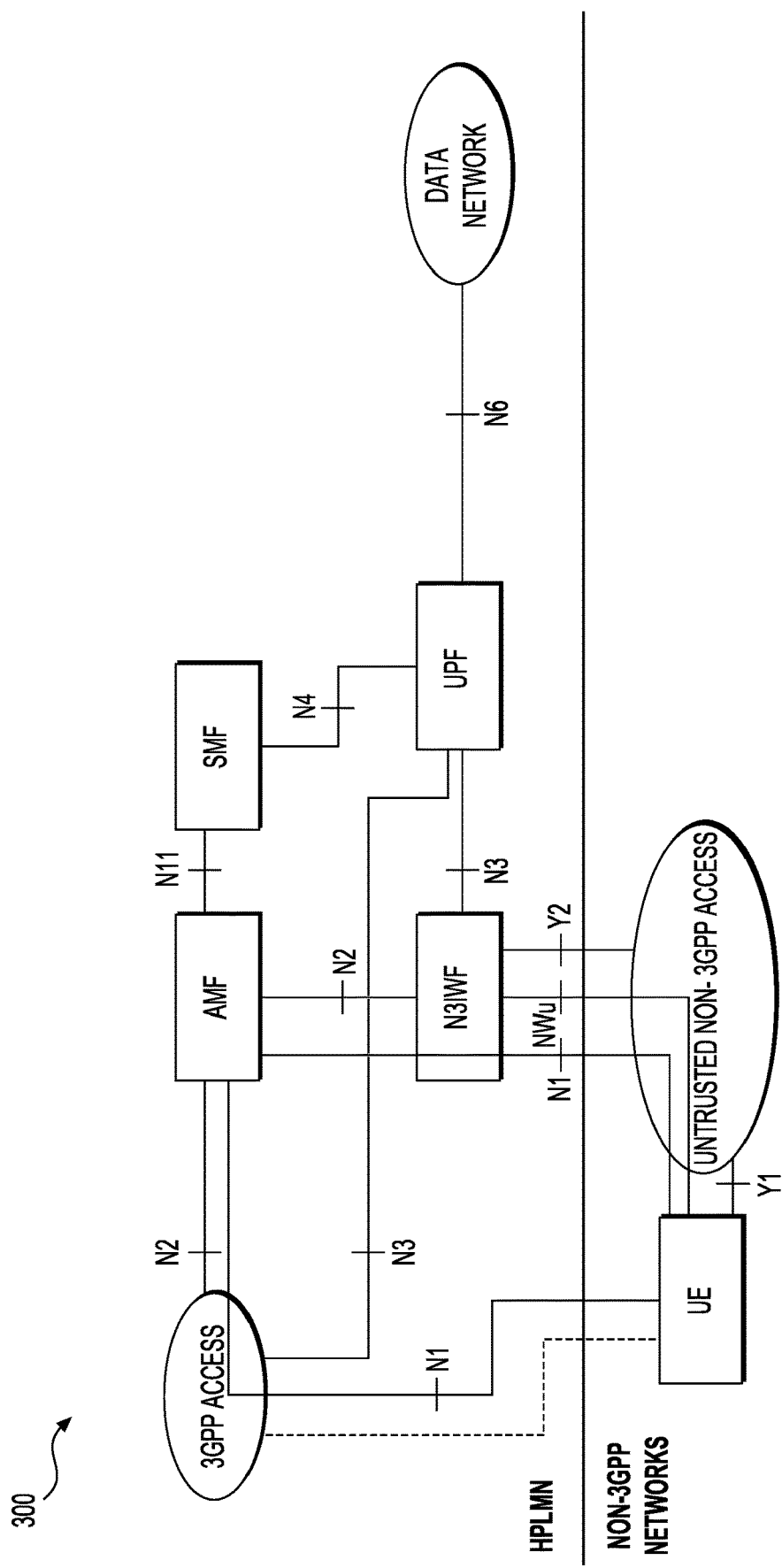
FIG. 3 illustrates traffic flow through a network for PDU establishment through non-cellular access, in accordance with certain aspects of the present disclosure.

FIG. 3 illustrates traffic flow 300 through a network for PDU establishment through non-3GPP access, in accordance with certain aspects of the present disclosure. As shown, the N3IWF/TNGF/W-AGF may be connected or interfaced with AMF of the first 5G network (PLMN1) at the first time. FIG. 3 shows traffic flow for the first 5G network (PLMN1) at the first time. Similar traffic flow may occur for PLMN2. The N3IWF/TNGF/W-AGF may be associated with the second 5G network at the second time. The N3IWF/TNGF/W-AGF may have a second interface (e.g., second N2) to AMF of the PLMN2. For instance, the N3IWF/TNGF/W-AGF may have a first N2 interface between the N3IWF/TNGF/W-AGF and a first AMF of the first PLMN. The N3IWF/TNGF/W-AGF may have a second N2 interface between the N3IWF/TNGF/W-AGF and a second AMF of the second PLMN. The first N2 interface may be active at the first time. The second N2 interface may be inactive at the first time. In some aspects, the first N2 interface may be inactive at the second time. The second N2 interface may be active at the second time.

In an example, the first N2 interface and the second N2 interface may be active all the time. The N3IWF/TNGF/W-AGF may forward control/data from both 5G networks at the same time. In an exmple, the first 5G network (e.g., PLMN1) may be an LTE/EPC network or 5G core network. The second 5G network (e.g., PLMN2) may be LTE/PEC network or 5G core network. Similarly, the N3IWF/TNGF/W-AGF may have a first N3 interface between the N3IWF/TNGF/W-AGF and a first AMF of the first PLMN. The N3IWF/TNGF/W-AGF may have a second N3 interface between the N3IWF/TNGF/W-AGF and a second AMF of the second PLMN. The first N3 interface may be active at the first time. The second N3 interface may be inactive at the first time. The first N3 interface may be inactive at the second time. The second N3 interface may be active at the second time. In an example, the first N3 interface and the second N3 interface may be active all the time. The N3IWF/TNGF/W-AGF may forward control/data from both 5G networks at the same time.

Figure 4:
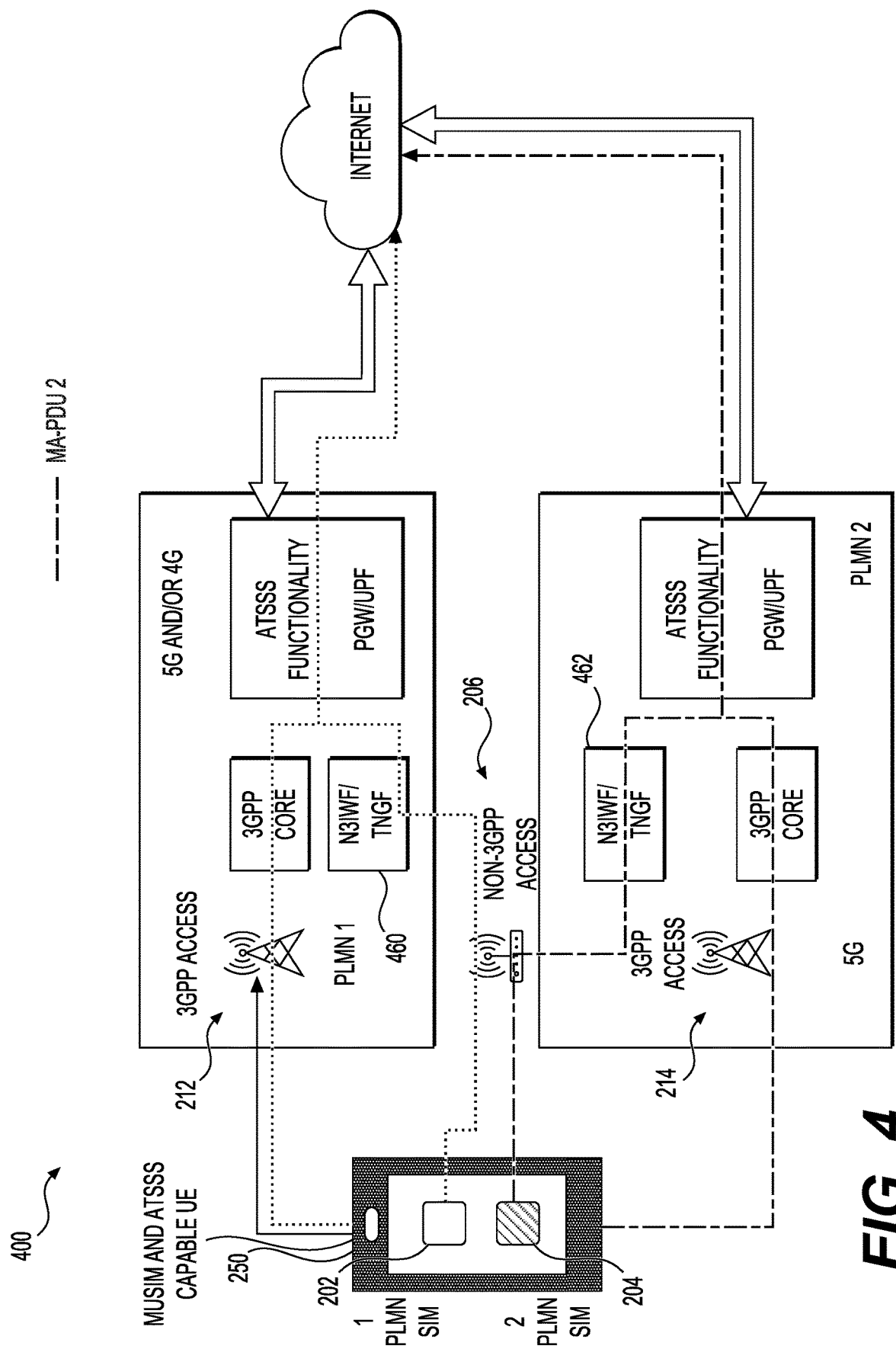
FIG. 4 illustrates an example communication system 400 having non-cellular access connected to two interworking functions, in accordance with certain aspects of the present disclosure.

FIG. 4 illustrates an example communication system 400 having non-3GPP access connected to two N3IWFs, in accordance with certain aspects of the present disclosure. For instance, N3IWF 460 may be part of PLMN1 and N3IWF 462 may be part of PLMN2, as shown. Wireless device 250 may establish a PDU session using AN 206 (e.g., WLAN, Wired, connection to cable modem, fiber, DSL, coaxial, and/or the like). The AN 206 may communicate with the N3IWF 460 of PLMN1 for establishing a PDU for PLMN1 and communicate with N3IWF 462 of PLMN2 for establishing a PDU for PLMN2. The AN 206 may be a wireless LAN. A gateway interface of a 5G core (5GC) for a WLAN access may be called a N3IWF. A gateway interface for a WLAN access may be a TNGF. A gateway interface for a wired access may be W-AGF. Scenarios/ examples provided herein may be described based on N3IWF to facilitate understanding. However, scenarios/ examples may be expanded/tailored/applied for other interfaces/gateway functions such as TNGF and W-AGF without loss of generality.

Figure 5:
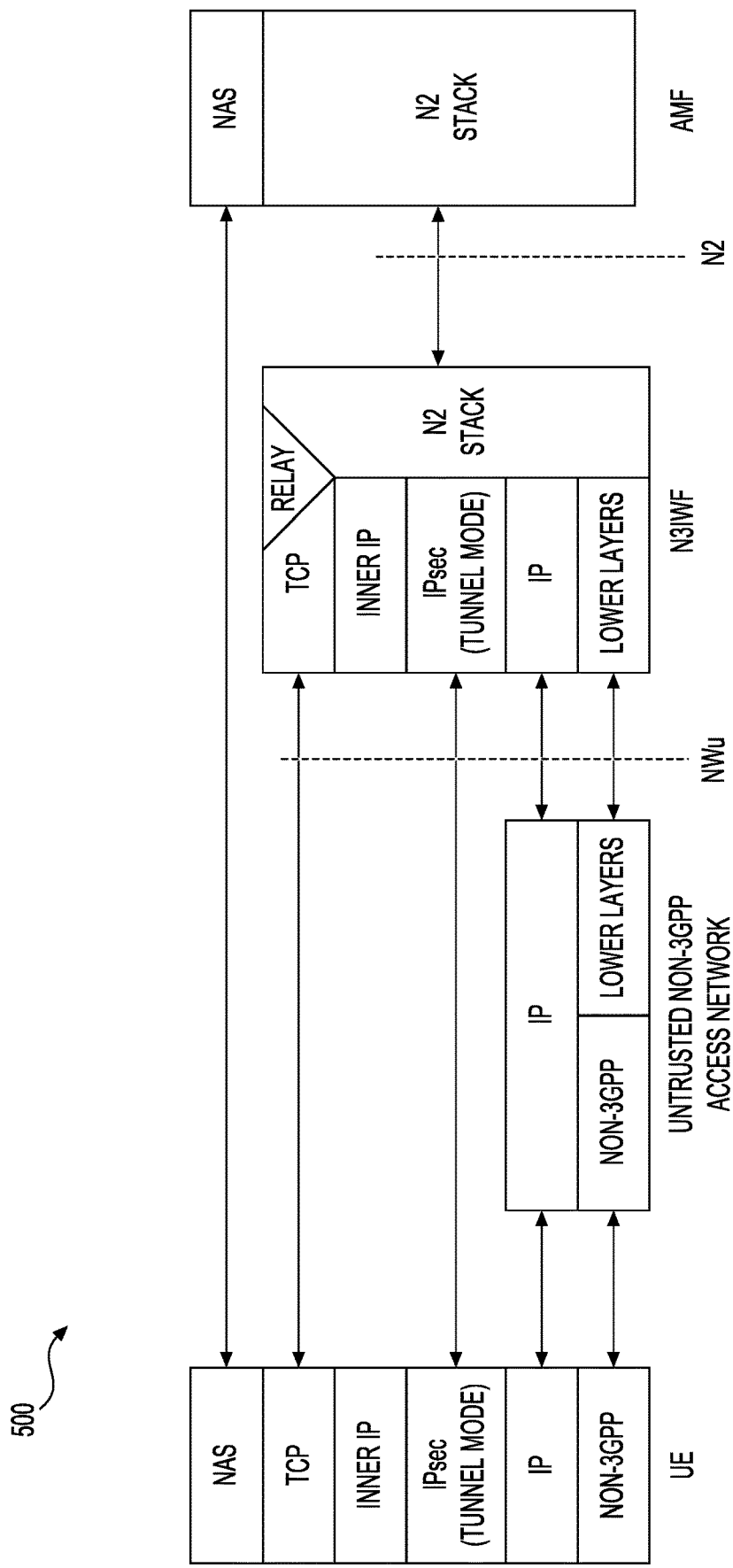
FIG. 5 illustrates communication paths between a wireless device and a gateway function, in accordance with certain aspects of the present disclosure.

FIG. 5 illustrates communication paths 500 between a wireless device (e.g., UE) and a N3IWF (e.g., a gateway function) of a 5G core (5GC). For example, the wireless device may establish an IPSec with the N3IWF. For example, a WLAN device of the wireless device may establish the IPSec. An IP address of the WLAN device may be used to establish the IPSec with the N3IWF. IDC-a2_Sub, AMD As shown in FIG. 4, a wireless device may be equipped with multiple SIMs or is registered via a plurality of 3GPP access networks/one or more 3GPP core networks. In this case, a first multi-access PDU session may be established via a first 3GPP access network (e.g., PLMN1) and via a access network 206 (e.g., WLAN) and a second multi-access PDU session may be established via a second 3GPP access network (e.g., PLMN2) and via the same access network 206, as shown. The non-3GPP access network may be shared between the first multi-access PDU session (e.g., first MA-PDU session) and the second multi-access PDU session (e.g., second MA-PDU session). Thus, registration may be performed for 5GC of PLMN1 and 5GC of PLMN2 via a shared non-3GPP access network. N3IWF to WLAN wrapper may handle multiple N3IWF interfaces and change to WLAN. Two IPSec channels (e.g., tunnels) may be used. For example, the wireless device 250 may have multiple IP addresses on the WLAN interface. For instance, the wireless device 250 may have multiple WLAN interfaces. The wireless device may have multiple non-3GPP access interfaces (e.g., WLAN and wired, WLAN and cable, WLAN and DSL, WLAN and Bluetooth®, and/or the like). The wireless device may have a WLAN interface that may have multiple IP addresses which may be based on IP aliasing. For example, a first N3IWF/TNGF may be connected via a first PLMN (PLMN1) and a second N3IWF/TNGF/W-AGF may be connected via a second PLMN (PLMN2).

Figure 6:
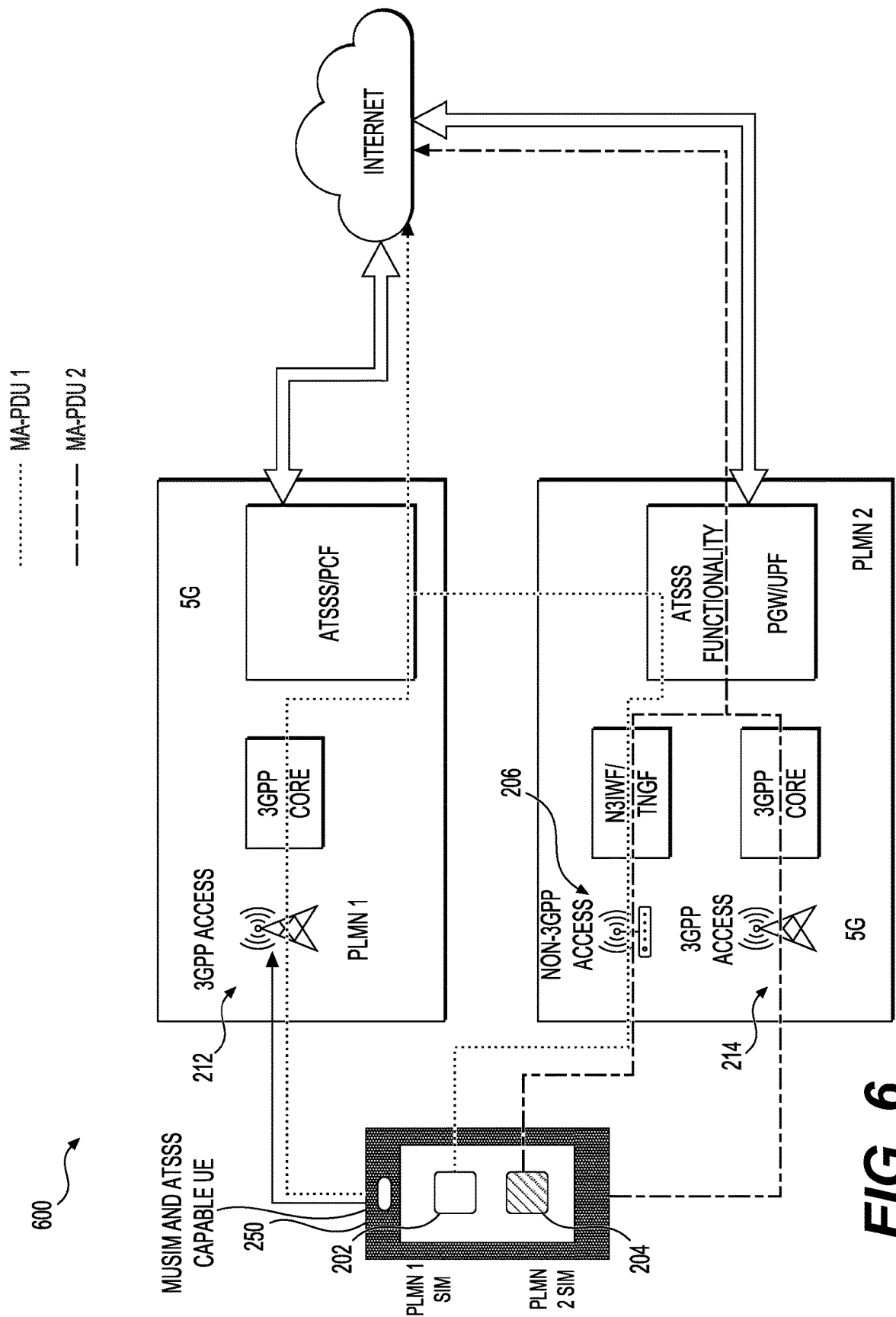
FIG. 6 illustrates a communication system including an interworking function of one network accessed by another network, in accordance with certain aspects of the present disclosure.

FIG. 6 illustrates a communication system 600 including an N3IWF of PLMN2 accessed by PLMN1, in accordance with certain aspects of the present disclosure. In an example, a access network 206 may be associated with one of the PLMNs (e.g., PLMN2). For example, the access network 206 may be connected to a second 5G network (e.g., PLMN2). The access network 206 may be shared between a first 5G network (e.g., PLMN1) and the second 5G network, where the access network 206 is homed in the second 5G network. Moreover, N3IWF of PLMN2 is shared between PLMN2 and PLMN1 (e.g., different PLMN having a roaming architecture). For example, a AN 206 (e.g., Wi-Fi network, WLAN, wired network, cable connection, residential gateway, fiber) may belong to PLMN2 such as a second 5G/3GPP network (e.g., EPC network, 5G core network). The non-3GPP access and N3IWF/TNGF/W-AGF network function may belong to the second 5G/3GPP network.

Figure 7:
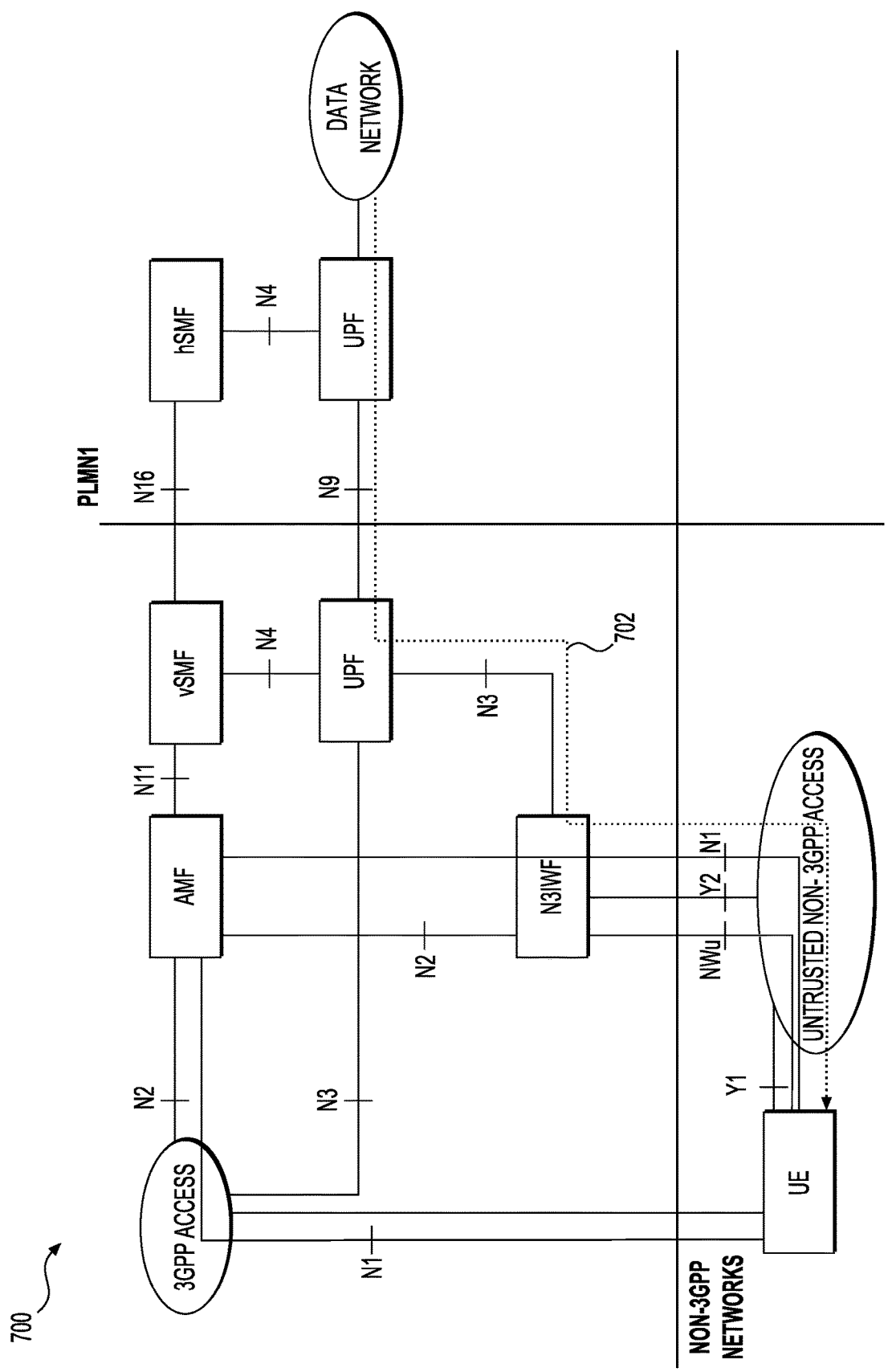
FIG. 7 illustrates an architecture where a non-cellular access and network function of one network is accessed or shared by another network, in accordance with certain aspects of the present disclosure.

FIG. 7 illustrates an architecture 700 where a non-3GPP access and N3IWF/TNGF/W-AGF network function is accessed/shared by a first 5G/3GPP network (e.g., PLMN1), in accordance with certain aspects of the present disclosure. Data flow 702 from a data network to a UE is shown. For example, data from a data network may be received by UPF of PLMN1. When data is steered to the non-3GPP access, the UPF of the PLMN1 forwards data to UPF of PLMN2. The UPF of PLMN2 may forward data via N3 interface to a N3IWF of PLMN2. The N3IWF may forward data to the non-3GPP access (e.g., AN 206). As described herein, the non-3GPP access may be part of PLMN2 or separate from PLMN2.

Data flow from PLMN2 may be forwarded from data network of the PLMN2. Data network of PLMN2 may be different or may be the same as the data network of PLMN1. Data may be forwarded to UPF of PLMN2, and then it may be forwarded to the N3IWF of the PLMN2 and then the non-3GPP access. In an example, a wireless device may be registered via the non-3GPP access in PLMN2. For example, AMF of PLMN2 may control registration of the wireless device.

Figure 8:
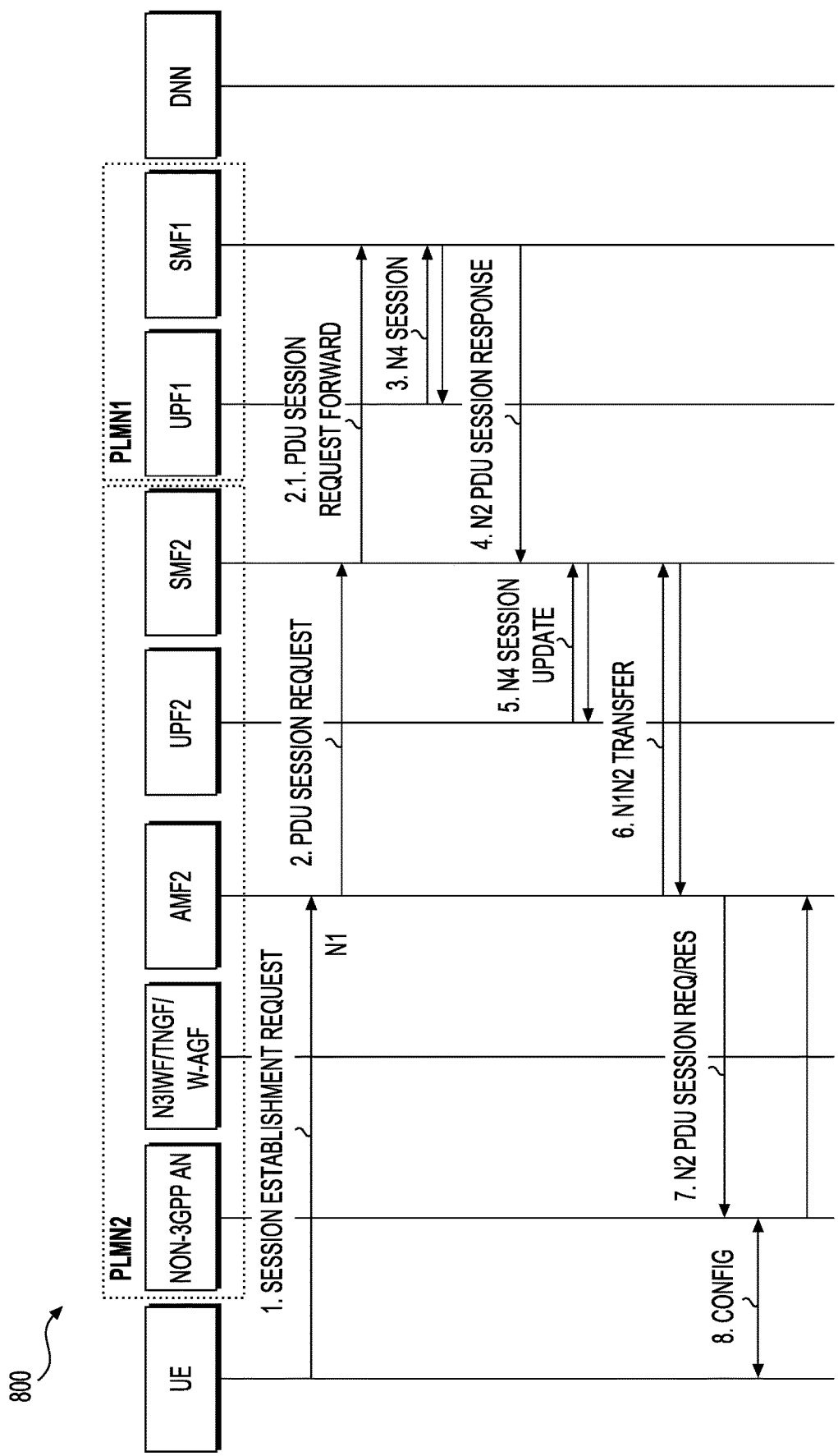
FIG. 8 is a call flow showing a PDU session establishment procedure when a network uses a non-cellular access network, in accordance with certain aspects of the present disclosure.

FIG. 8 is a call flow showing a PDU session establishment procedure 800 when a first 5G/3GPP network uses/accesses the non-3GPP access, in accordance with certain aspects of the present disclosure. The wireless device may be already registered on the AMF of the PLMN2 (e.g., AMF2). As shown, a session establishment request may be sent from the wireless device (e.g., UE) to AMF of PLMN2 (AMF2). A NAS message (e.g., single—network slice selection assistance information (S-NSSAI(s)), UE requested data network name (DNN), PDU Session ID, Request type, Old PDU Session ID, N1 session management (SM) container (PDU Session Establishment Request, [Port Management Information Container])). In order to establish a new PDU Session, the UE generates a new PDU Session ID. The UE initiates the UE requested PDU session establishment procedure by the transmission of a NAS message containing a PDU session establishment request within the N1 SM container. The PDU session establishment request includes a PDU session ID, requested PDU session type, a requested SSC mode, 5GSM capability, protocol configuration options (PCO), SM PDU DN request container, [Number Of Packet Filters], [Header Compression Configuration], UE integrity protection maximum data rate, [always-on PDU session requested], [robust security network (RSN)] and [PDU session pair ID].

The Request Type indicates "Initial request" if the PDU session establishment is a request to establish a new PDU session and indicates "Existing PDU Session" if the request refers to an existing PDU Session switching between 3GPP access and non-3GPP access or to a PDU session handover from an existing PDN connection in EPC. When emergency service is required and an emergency PDU session is not already established, a UE may initiate the UE requested PDU session establishment procedure with a request type indicating "Emergency Request".

The request type indicates "Emergency Request" if the PDU session establishment is a request to establish a PDU Session for Emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The number of packet filters indicates the number of supported packet filters for signaled quality of service (QoS) rules for the PDU Session that is being established. The number of packet filters indicated by the UE may be valid for the lifetime of the PDU Session.

The UE integrity protection maximum data rate indicates the maximum data rate up to which the UE can support user plane (UP) integrity protection. The UE may provide the UE integrity protection data rate capability independently of the access type over which the UE sends the PDU session establishment request. If the use of header compression for control plane cellular internet of things (CIoT) 5GS optimization is negotiated successfully between the UE and the network in a previous registration procedure, the UE shall include the header compression configuration, unless "Unstructured" PDU session type is indicated. The header compression configuration includes the information for the header compression channel setup. Optionally, the header compression configuration may include additional header compression context parameters.

The NAS message sent by the UE may be encapsulated by the access network (AN) in an N2 message towards the AMF that may include user location information and access type information. The PDU session establishment request message may contain SM PDU DN request container containing information for the PDU session authorization by the external DN.

The UE includes the S-NSSAI from the allowed NSSAI of the current access type. If the mapping of allowed NSSAI was provided to the UE, the UE may provide both the S-NSSAI of the visited PLMN (VPLMN) from the allowed NSSAI and the corresponding S-NSSAI of the HPLMN from the mapping of allowed NSSAI.

If the procedure is triggered for session and service continuity (SSC) mode 3 operation, the UE may also include an old PDU session ID which indicates the PDU session ID of the on-going PDU session to be released, in NAS message.

The AMF may receive from the AN the NAS SM message together with user location information (e.g. Cell Id in the case of the NG-RAN). The UE may not trigger a PDU Session establishment for a PDU session corresponding to a local area data network (LADN) when the UE is outside the area of availability of the LADN. If the UE is establishing a PDU session for IP multimedia subsystem (IMS), and the UE is configured to discover the proxy call session control function (P-CSCF) address during connectivity establishment, the UE may include an indicator that it requests a P-CSCF IP address(es) within the SM container.

The PS Data Off status may be included in the PCO in the PDU session establishment request message. The UE capability to support reliable data service may be included in the PCO in the PDU session establishment request message. If the UE has indicated that it supports transfer of port management information containers as per UE 5 GSM core network capability and if the PDU session type is Ethernet, then the UE may include the MAC address of the devise side (DS)-time sensitive networking (TSN) translator (TT) Ethernet port used for this Ethernet PDU session. If the UE is aware of the UE-DS-TT residence time, then the UE may additionally include the UE-DS-TT residence time.

If the UE requests to establish always-on PDU session, the UE includes an always-on PDU session requested indication in the PDU session establishment request message. A UE that hosts EEC(s) may indicate in the PCO that it supports the ability to receive ECS address(es) via NAS and to transfer the ECS address(es) to the EEC(s). The UE may also include PDU session pair ID and/or RSN in PDU Session Establishment Request message. A UE that supports EAS re-discovery, may indicate so in the PCO. Port management information container may be received from DS-TT and includes port management capabilities, i.e. information indicating which standardized and deployment-specific port management information is supported by DS-TT.

If the UE provides request type as "MA PDU Request" in UL NAS transport message and its ATSSS capability, this may be for a multi-access PDU session establishment procedure. If the UE provides request type as "MA PDU Request homed in different network" in UL NAS transport message and its ATSSS capability, this is for a multi-access PDU session establishment procedure, where an access network (e.g., non-3GPP access or 3GPP access) may forward request.

As shown in FIG. 8, the AMF of PLMN2 (AMF2) forwards request to SMF of PLMN2 (SMF2). For NR satellite access, the AMF may decide to verify the UE location. In this case, if the AMF can determine based on the ULI (including Cell ID) received from the base station (e.g., next-generation node-B (gNB)) that UE has registered to a PLMN that is not allowed to operate at the present UE location, then the AMF may reject the PDU session establishment request and further deregister the UE. Otherwise, if the AMF is not aware of the UE location with sufficient accuracy to make a final decision, the AMF proceeds with the PDU session establishment procedure and may initiate 5GC-NI-LR procedure, and deregisters the UE. If the information received form the LMF proves that the UE is registered to a PLMN that is not allowed to operate in the UE location.

The AMF (AMF2) determines that the message corresponds to a request for a new PDU session based on that request type indicating "initial request" and that the PDU session ID is not used for any existing PDU session of the UE. If the NAS message does not contain an S-NSSAI, the AMF determines an S-NSSAI of the serving PLMN for the requested PDU session from the current allowed NSSAI for the UE. If there is only one S-NSSAI in the allowed NSSAI, this S-NSSAI may be used. If there is more than one S-NSSAI in the allowed NSSAI, the S-NSSAI selected is either according to the UE subscription, if the subscription contains only one default S-NSSAI and the corresponding mapped HPLMN S-NSSAI of the Serving PLMN is included in the Allowed NSSAI, or based on operator policy (e.g., so any UE Requested DNN is allowed for the selected S-NSSAI)). When the NAS message contains an S-NSSAI of the serving PLMN but it does not contain a DNN, the AMF determines the DNN for the requested PDU Session by selecting the default DNN for this S-NSSAI if the default DNN is present in the UE's subscription information (or for the corresponding S-NSSAI of the home PLMN (HPLMN), in the case of LBO); otherwise the serving AMF selects a locally configured DNN for this S-NSSAI of the serving PLMN. If the AMF cannot select an SMF (e.g. the UE requested DNN is not supported by the network, or the UE requested DNN is not in the subscribed DNN List for the S-NSSAI (or its mapped value for the HPLMN in the case of LBO) and wildcard DNN is not included in the subscribed DNN list), the AMF may, based on operator policies received from PCF, either reject the NAS Message containing PDU session establishment request from the UE with an appropriate cause or request PCF to replace the UE requested DNN by a selected DNN. If the DNN requested by the UE is present in the UE subscription information but indicated for replacement in the operator policies received from PCF, the AMF shall request the PCF to perform a DNN replacement to a selected DNN. If the DNN requested by the UE is present in the UE subscription information but not supported by the network and not indicated for replacement in the operator policies received from PCF, the AMF may reject the NAS Message containing PDU session establishment request from the UE with an appropriate cause value.

The AMF may select an SMF. If the request type indicates "Initial request" or the request is due to handover from EPS or from non-3GPP access serving by a different AMF, the AMF stores an association of the S-NSSAI(s), the DNN, the PDU Session ID, the SMF ID as well as the Access Type of the PDU Session. The AMF may select a SMF that supports a multi-access PDU session when the session establishment request is for a multi-access PDU session.

During registration procedures, the AMF determines the use of the control plane CIoT 5GS optimization or user plane CIoT 5GS optimization based on UEs indications in the 5G preferred network behavior, the serving operator policies and the network support of CIoT 5GS optimisations. The AMF selects an SMF that supports Control Plane CIoT 5GS optimisation or User Plane CIoT 5GS optimization.

If the Request Type is "initial request" and if the old PDU Session ID indicating the existing PDU Session is also contained in the message, the AMF selects an SMF and stores an association of the new PDU Session ID, the S-NSSAI(s), the selected SMF ID as well as access type of the PDU Session.

If the Request Type indicates "Existing PDU Session", the AMF selects the SMF based on SMF-ID received from UDM. The case where the request type indicates "Existing PDU Session", and either the AMF does not recognize the PDU session ID or the subscription context that the AMF received from UDM during the registration or subscription profile update notification procedure does not contain an SMF ID corresponding to the PDU Session ID constitutes an error case. The AMF updates the access type stored for the PDU Session.

If the Request Type indicates "Existing PDU Session" referring to an existing PDU session moved between 3GPP access and non-3GPP access, then if the Serving PLMN S-NSSAI of the PDU Session is present in the allowed NSSAI of the target access type, the PDU session establishment procedure can be performed in the following cases: the SMF ID corresponding to the PDU Session ID and the AMF belong to the same PLMN; the SMF ID corresponding to the PDU Session ID belongs to the HPLMN; Otherwise the AMF shall reject the PDU Session Establishment Request-with an appropriate reject cause. The SMF ID includes the PLMN ID that the SMF belongs to.

The AMF shall reject a request coming from an Emergency Registered UE and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead. The AMF stores the access type of the PDU Session.

If the request type indicates "Emergency Request" or "Existing Emergency PDU Session", the AMF selects the SMF. From AMF to SMF: either Nsmf_PDUSession_CreateSMContext Request (SUPI, selected DNN, UE requested DNN, S-NSSAI(s), PDU Session ID, AMF ID, Request Type, [PCF ID, Same PCF Selection Indication], Priority Access, [Small Data Rate Control Status], N1 SM container (PDU Session Establishment Request), User location information, Access Type, RAT Type, PEI, GPSI, UE presence in LADN service area, Subscription For PDU Session Status Notification, DNN Selection Mode, Trace Requirements, Control Plane CIoT 5GS Optimisation indication, Control Plane Only indicator, Satellite backhaul category) or Nsmf_PDUSession_UpdateSMContext Request (SUPI, DNN, S-NSSAI(s), SM Context ID, AMF ID, Request Type, N1 SM container (PDU Session Establishment Request), User location information, Access Type, RAT type, PEI, Serving Network (PLMN ID, or PLMN ID and NID), Satellite backhaul category).

If the AMF does not have an association with an SMF for the PDU session ID provided by the UE (e.g. when request type indicates "initial request"), the AMF invokes the Nsmf_PDUSession_CreateSMContext Request, but if the AMF already has an association with an SMF for the PDU Session ID provided by the UE (e.g. when request type indicates "existing PDU session"), the AMF invokes the Nsmf_PDUSession_UpdateSMContext request.

The AMF sends the S-NSSAI of the serving PLMN from the allowed NSSAI to the SMF. For roaming scenario in local breakout (LBO), the AMF also sends the corresponding S-NSSAI of the HPLMN from the mapping of allowed NSSAI to the SMF. The AMF ID is the UE's GUAMI which uniquely identifies the AMF serving the UE. The AMF forwards the PDU Session ID together with the N1 SM container containing the PDU session establishment request received from the UE. The GPSI may be included if available at AMF.

The AMF provides the PEI instead of the SUPI when the UE in limited service state has registered for emergency services (e.g., Emergency Registered) without providing a SUPI. If the UE in limited service state has registered for Emergency services (e.g., Emergency Registered) with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the AMF determines that the selected DNN corresponds to an LADN then the AMF provides the "UE presence in LADN service area" that indicates if the UE is in or out of the LADN service area. If the old PDU session ID is included in step 1, and if the SMF is not to be reallocated, the AMF also includes old PDU session ID in the Nsmf_P-DUSession_CreateSMContext request. DNN Selection Mode may be determined by the AMF. It indicates whether an explicitly subscribed DNN has been provided by the UE in its PDU session establishment request. The SMF may use DNN selection mode when deciding whether to accept or reject the UE request.

When the establishment cause received as part of AN parameters during the registration procedure or service Request procedure is associated with priority services (e.g. MPS, MCS), the AMF includes a message priority header to indicate priority information. The SMF uses the message priority header to determine if the UE request is subject to exemption from NAS level congestion control. Other NFs relay the priority information by including the Message Priority header in service-based interfaces.

In the local breakout case, if the SMF (in the VPLMN) is not able to process some part of the N1 SM information that home routed roaming is required, and the SMF responds to the AMF that it is not the right SMF to handle the N1 SM message by invoking Nsmf_PDUSession_CreateSMContext response service operation. The SMF includes a proper N11 cause code triggering the AMF to proceed with home routed case.

In the non-roaming case, for PDU Session with request type "initial request", the AMF checks if the PCF selection assistance info from the UDM indicates that the same PCF is required for the requested DNN and S-NSSAI, and if required, the AMF includes in Nsmf_PDUSession_CreateSMContext request both the same PCF selection indication and the PCF ID selected by the AMF, this PCF ID identifies the H-PCF. If PCF selection assistance info is not received from the UDM, the AMF may include a PCF ID in the Nsmf_PDUSession_CreateSMContext request based on operator policies. This PCF ID identifies the H-PCF in the non-roaming case and the V-PCF in the local breakout roaming case. The AMF includes trace requirements if trace requirements have been received in subscription data.

If the AMF decides to use the control plane CIoT 5GS optimization or user plane CIoT 5GS optimization or to only use control Plane CIoT 5GS optimization for the PDU session as, the AMF sends the Control Plane CIoT 5GS optimization indication or control plane only indicator to the SMF.

If the AMF determines that the RAT type is NB-IoT and the number of PDU sessions with user plane resources activated for the UE has reached the maximum number of supported user plane resources (0, 1 or 2) based on whether the UE supports UP data transfer and the UE's 5GMM core network capability, the AMF may either reject the PDU session establishment request or continue with the PDU session establishment and include the control plane CIoT 5GS optimization indication or control plane only indicator to the SMF.

The AMF includes the latest small data rate control status if it has stored it for the PDU Session. If the RAT type was included in the message, then the SMF stores the RAT type in SM context. If the UE supports CE mode B and use of CE mode B is not restricted according to the enhanced coverage restriction information in the UE context in the AMF, then the AMF may include the extended NAS-SM timer indication. Based on the extended NAS-SM timer indication, the SMF may use the extended NAS-SM timer setting for the UE.

If the identity of an NWDAF is available to the AMF, the AMF informs the SMF of the NWDAF ID(s) used for UE related analytics and corresponding analytics ID(s). If the AMF, based on configuration, is aware that the UE is accessing over a gNB using satellite backhaul, the AMF includes satellite backhaul category indication.

If Session Management Subscription data for corresponding SUPI, DNN and S-NSSAI of the HPLMN is not available, then SMF retrieves the Session Management Subscription data using Nudm_SDM_Get (SUPI, Session Management Subscription data, selected DNN, S-NSSAI of the HPLMN, Serving PLMN ID, [NID]) and subscribes to be notified when this subscription data is modified using Nudm_SDM_Subscribe (SUPI, Session Management Subscription data, selected DNN, S-NSSAI of the HPLMN, Serving PLMN ID, [NID]). UDM may get this information from UDR by Nudr_DM_Query (SUPI, Subscription Data, Session Management Subscription data, selected DNN, S-NSSAI of the HPLMN, Serving PLMN ID, [NID]) and may subscribe to notifications from UDR for the same data by Nudr_DM_subscribe.

The SMF may use DNN selection mode when deciding whether to retrieve the session management subscription data e.g. if the (selected DNN, S-NSSAI of the HPLMN) is not explicitly subscribed, the SMF may use local configuration instead of Session Management Subscription data. If the request type indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the request type is "Initial request" and if the old PDU session ID is included in Nsmf_PDUSession_CreateSMContext request, the SMF identifies the existing PDU session to be released based on the old PDU session ID. Subscription data includes the allowed PDU session type(s), allowed SSC mode(s), default 5QI and ARP, subscribed Session-AMBR, SMF-Associated external parameters. IP Index or Static IP address/prefix may be included in the subscription data if the UE has subscribed to it.

The SMF checks the validity of the UE request by checking: whether the UE request is compliant with the user subscription and with local policies; (If the selected DNN corresponds to an LADN), whether the UE is located within the LADN service area based on the "UE presence in LADN service area" indication from the AMF. If the AMF does not provide the "UE presence in LADN service area" indication and the SMF determines that the selected DNN corresponds to a LADN, then the SMF considers that the UE is OUT of the LADN service area.

The SMF determines whether the PDU Session requires redundancy and the SMF determines the RSN. If the SMF determines that redundant handling is not allowed or not possible for the given PDU session, the SMF may either reject the establishment of the PDU session or accept the establishment of a PDU session without redundancy handling based on local policy.

If the UE request is considered as not valid, the SMF decides to not accept to establish the PDU Session. The SMF can, instead of the Nudm_SDM_Get service operation, use the Nudm_SDM_Subscribe service operation with an immediate report Indication that triggers the UDM to immediately return the subscribed data if the corresponding feature is supported by both the SMF and the UDM.

From SMF to AMF, either Nsmf_PDUSession_CreateSMContext response (Cause, SM Context ID or N1 SM container (PDU Session Reject (Cause))) or an Nsmf_PDUSession_UpdateSMContext response may be used depending on the request received. If the SMF received Nsmf_PDUSession_CreateSMContext request and the SMF is able to process the PDU session establishment request, the SMF creates an SM context and responds to the AMF by providing an SM context ID. If the UP security policy for the PDU session is determined to have integrity protection set to "Required", the SMF may, based on local configuration, decide whether to accept or reject the PDU session request based on the UE integrity protection maximum data rate. The SMF can e.g. be configured to reject a PDU Session if the UE integrity protection maximum data rate has a very low value, if the services provided by the DN would require higher bitrates.

When the SMF decides to not accept to establish a PDU Session, the SMF rejects the UE request via NAS SM signalling including a relevant SM rejection cause by responding to the AMF with Nsmf_PDUSession_CreateSMContext response. The SMF also indicates to the AMF that the PDU session ID is to be considered as released, the PDU session establishment procedure is stopped.

If the SMF needs to perform secondary authentication/authorization during the establishment of the PDU session by a DN-AAA server, the SMF triggers the PDU session establishment authentication/authorization.

At step 2.1, the SMF of PLMN2 (SMF2) forwards request to SMF of PLMN1 (SMF1). For example, the session establishment request is for the PLMN1, the SMF2 may forward the request message to the PLMN1. For example, the session establishment request may indicate request DNN address that is belonging to the PLMN1. Based on the UE requested DNN address, the AMF2 and/of the SMF2 may determine whether the session establishment request needs to be forwarded to the PLMN1 or not. SMF1 (SMF of the PLMN1) may be identified during a UE registration via the AN and the PLMN1.

For example, the wireless device may register the PLMN1 via the AN. This may be called as non-3GPP-reg1. The wireless device may register the PLMN2 via the AN. This may be called as non-3GPP-reg2. In an example, the non-3GPP-reg1 may be based on a home-routed roaming architecture or a local-breakout roaming architecture. The PLMN1 for the non-3GPP-Reg1, the PLMN1 may be a home network and the PLMN2 may be a visitor network. The wireless device may register the PLMN2 as the visitor network where home is in the PLMN1. In an example, the non-3GPP-reg2 may be based on a non-roaming architecture where home of the non-3GPP-reg2 is the PLMN2. The SMF1 may perform 'subscription data retrieval/subscribe' via UDM of the PLMN1. A PDU session authentication and/or authorization may occur between the wireless device and the UDM of the PLMN1. The SFM2 may select a PCF of the PLMN1 (e.g., PCF1). The PCF1 may be in charge of policy control of the wireless device and the PDU session. The SMF1 may establish N4 session with UPF of the PLMN1 (UPF1), as shown. The SMF1 may register to the UDM for the PDU session. The SMF1 may respond to the SMF2 (e.g., Nsmf_PDUSession_CreateResponse). The SMF2 may establish N4 session with UPF of PLMN2 (UPF2). The N1/N2 message transfer/tunnels may be setup between the AMF of the PLMN2 (AMF2) and the SMF of the PLMN2 (SMF2). The N2 message transfer/tunnel(s) may be setup between the non-3GPP access and the AMF2. The N2 PDU session request is sent by the AMF2 to the non-3GPP access. The AN may configure the wireless device (e.g., WLAN QoS handling). The N2 PDU session request acknowledgement may be sent by the AN (and/or N3IWF) to the AMF2.

Figure 9:
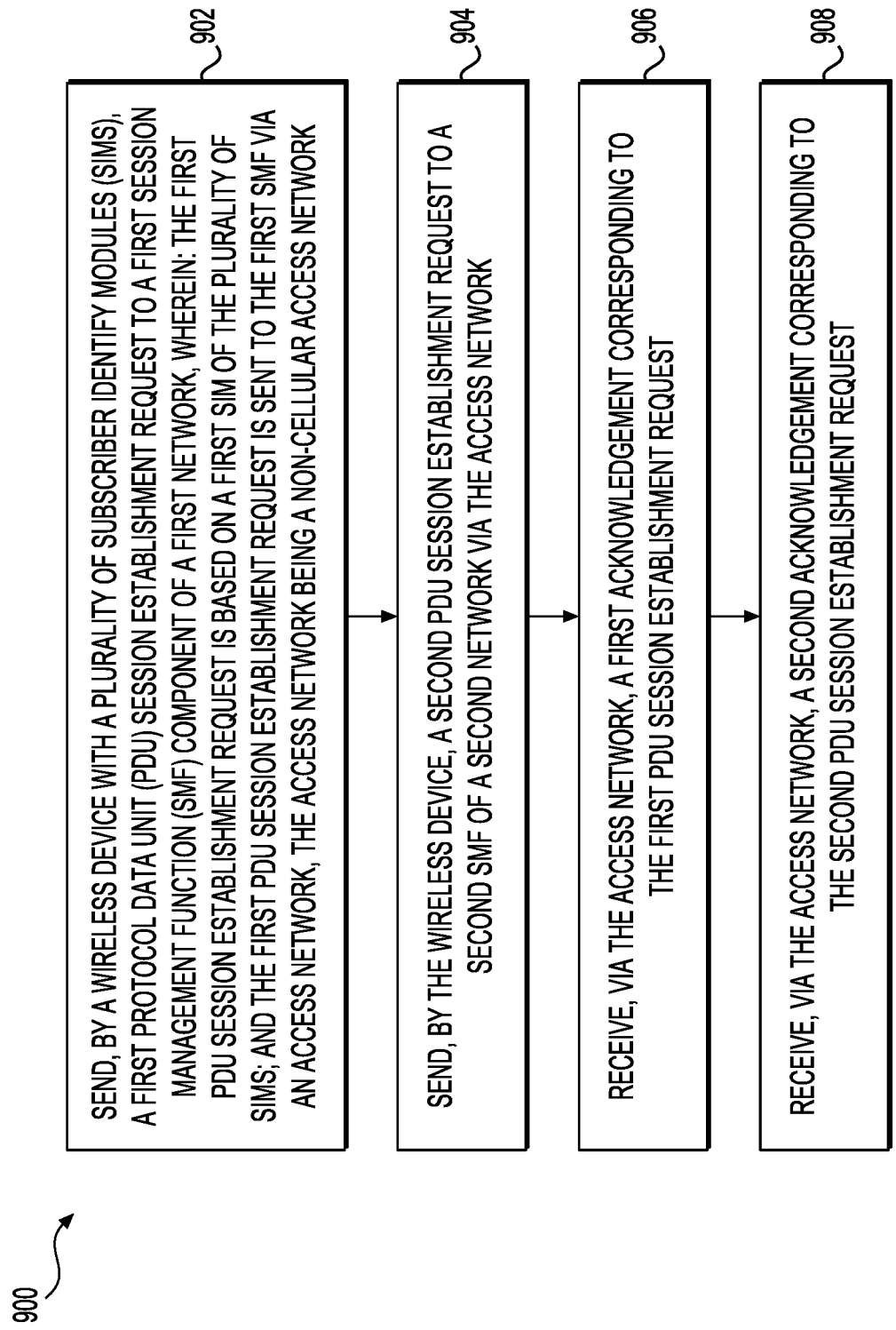
FIG. 9 is a flow diagram illustrating example operations for wireless communication by a wireless device, in accordance with certain aspects of the present disclosure.

FIG. 9 is a flow diagram illustrating example operations 900 for wireless communication, in accordance with certain aspects of the present disclosure. The operations 900 may be performed by a wireless device having a plurality of SIMs, such as the wireless device 250.

At block 902, the wireless device sends a first PDU session establishment request to a first network (e.g., PLMN1) (e.g., to a first SMF of the first network). The first PDU session establishment request may be based on a first SIM (e.g., SIM 202) of the plurality of SIMs. The first PDU session establishment request may be sent via an access network. In some aspects, the access network may be a non-cellular access network (e.g., access network 206). In some cases, the access network may be a 3GPP network. The non-cellular access network may be a wireless local area network, a wired local area network, or a WiFi network. The first access network may be part of the second network (e.g., as described with respect to FIG. 6), or may be separate from the first network and the second network (e.g., as described with respect to FIGS. 2 and 4).

In some aspects, the non-cellular access network communicates with a gateway interface (e.g., a N3IWF component, a TNGF component, or a W-AGF component). The N3IWF component, TNFG component, or the W-AGF component may be separate from the first network and the second network (e.g., as described with respect to FIG. 2). In some aspects, the N3IWF component, TNFG component, or the W-AGF component may be part of the second network (e.g., as described with respect to FIG. 4 or FIG. 6).

At block 904, the wireless device may send a second PDU session establishment request to a second network (e.g., PLMN2) (e.g., to a second SMF of the second network) via the access network. At block 906, the wireless device may receive, via the access network, a first acknowledgement corresponding to the first PDU session establishment request. At block 908, the wireless device may receive, via the access network, a second acknowledgement corresponding to the second PDU session establishment request.

Figure 10:
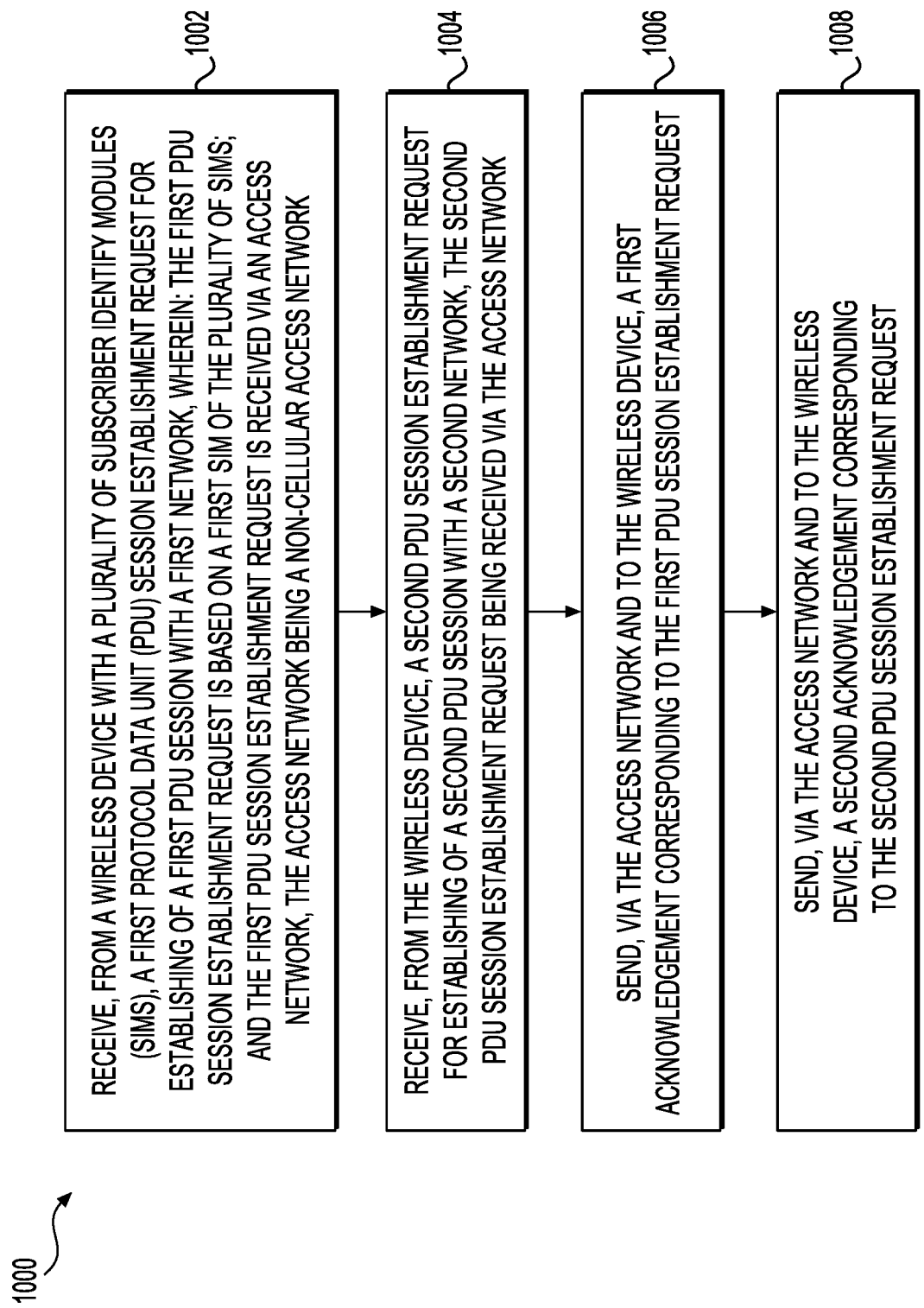
FIG. 10 is a flow diagram illustrating example operations for wireless communication by a network node, in accordance with certain aspects of the present disclosure.

FIG. 10 is a flow diagram illustrating example operations 1000 for wireless communication, in accordance with certain aspects of the present disclosure. The operations 1000 may be performed by a network component, such as a gateway interface (e.g., an N3IWF component, a TNFG component, or a W-AGF component).

At block 1002, the network component receives, from a wireless device (e.g., with a plurality of subscriber identify modules (SIMs)), a first PDU session establishment request for establishing of a first PDU session with a first network. The first PDU session establishment request may be based on a first SIM of the plurality of SIMs. The first PDU session establishment request may be received via an access network. In some aspects, the access network being a non-cellular access network (e.g., non-3GPP access network). The non-cellular access network may be a wireless local area network, a wired local area network, or a WiFi network. In some cases, the access network may be a 3GPP access network.

At block 1004, the network component receives, from the wireless device, a second PDU session establishment request for establishing of a second PDU session with a second network, the second PDU session establishment request being received via the access network. The first access network may be part of the second network or may be separate from the first and second networks.

In some aspects, the non-cellular access network communicates with a gateway interface (e.g., N3IWF component, a TNGF component, or a W-AGF component) for PDU session establishment. The N3IWF component, TNFG component, or the W-AGF component may be separate from the first network and the second network, or may be part of the second network.

At block 1006, the network component sends, via the access network and to the wireless device, a first acknowledgement corresponding to the first PDU session establishment request, and at block 1008, sends, via the access network and to the wireless device, a second acknowledgement corresponding to the second PDU session establishment request.

Figure 11:
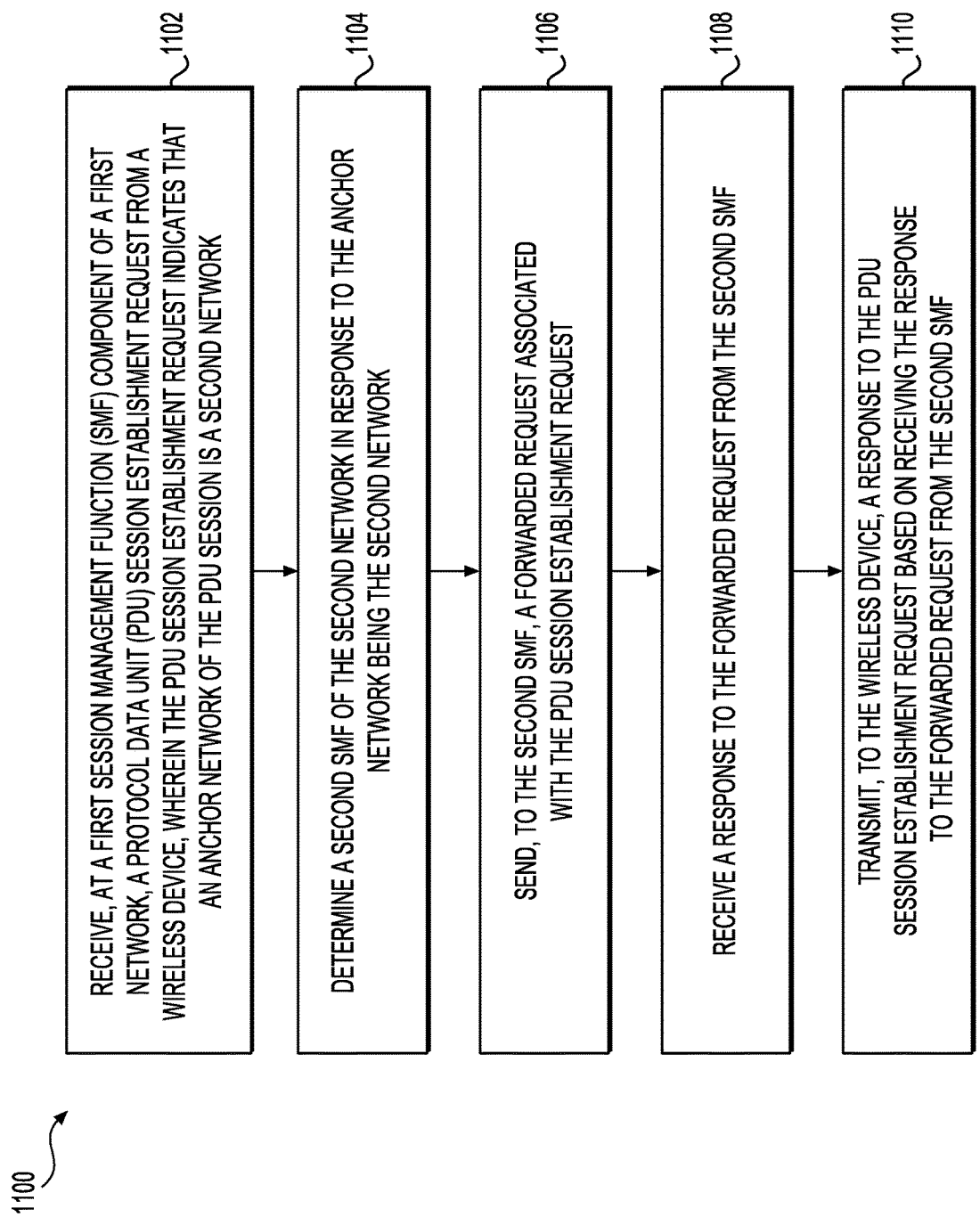
FIG. 11 is a flow diagram illustrating example operations for wireless communication by a network node, in accordance with certain aspects of the present disclosure.

FIG. 11 is a flow diagram illustrating example operations 1100 for wireless communication, in accordance with certain aspects of the present disclosure. The operations 1100 may be performed by a network component, such as session management function (SMF) component (e.g., SMF of PLMN2 as described with respect to FIGS. 7 and 8).

At block 1102, the network component may receive, at a first SMF component of a first network (e.g., PLMN2), a PDU session establishment request from a wireless device (e.g., UE shown in FIG. 8 or wireless device 250 shown in FIG. 6). The PDU session establishment request may indicate that an anchor network of the PDU session is a second network (e.g., PLMN1). The PDU session establishment request may indicate a PDU session identifier. For instance, indicating the anchor network is the second network may include indicating a PDU session identifier that is registered with the second SMF of the second network.

Indicating the anchor network is the second network may include indicating a PLMN identifier of the second network. Indicating the anchor network is the second network may include indicating a data network node address that is associated with the second network. The anchor network may be a primary session anchor UPF component. For instance, a access traffic steering, switching and splitting (ATSSS) function may be performed at the anchor network, as described with respect to FIG. 6.

At block 1104, the network component determines a second SMF of the second network in response to the anchor network being the second network. At block 1106, the network component sends, to the second SMF, a forwarded request associated with the PDU session establishment request.

At block 1108, the network component receives a response to the forwarded request from the second SMF. At block 1110, the network component transmits, to the wireless device, a response to the PDU session establishment request based on receiving the response to the forwarded request from the second SMF.

Figure 12:
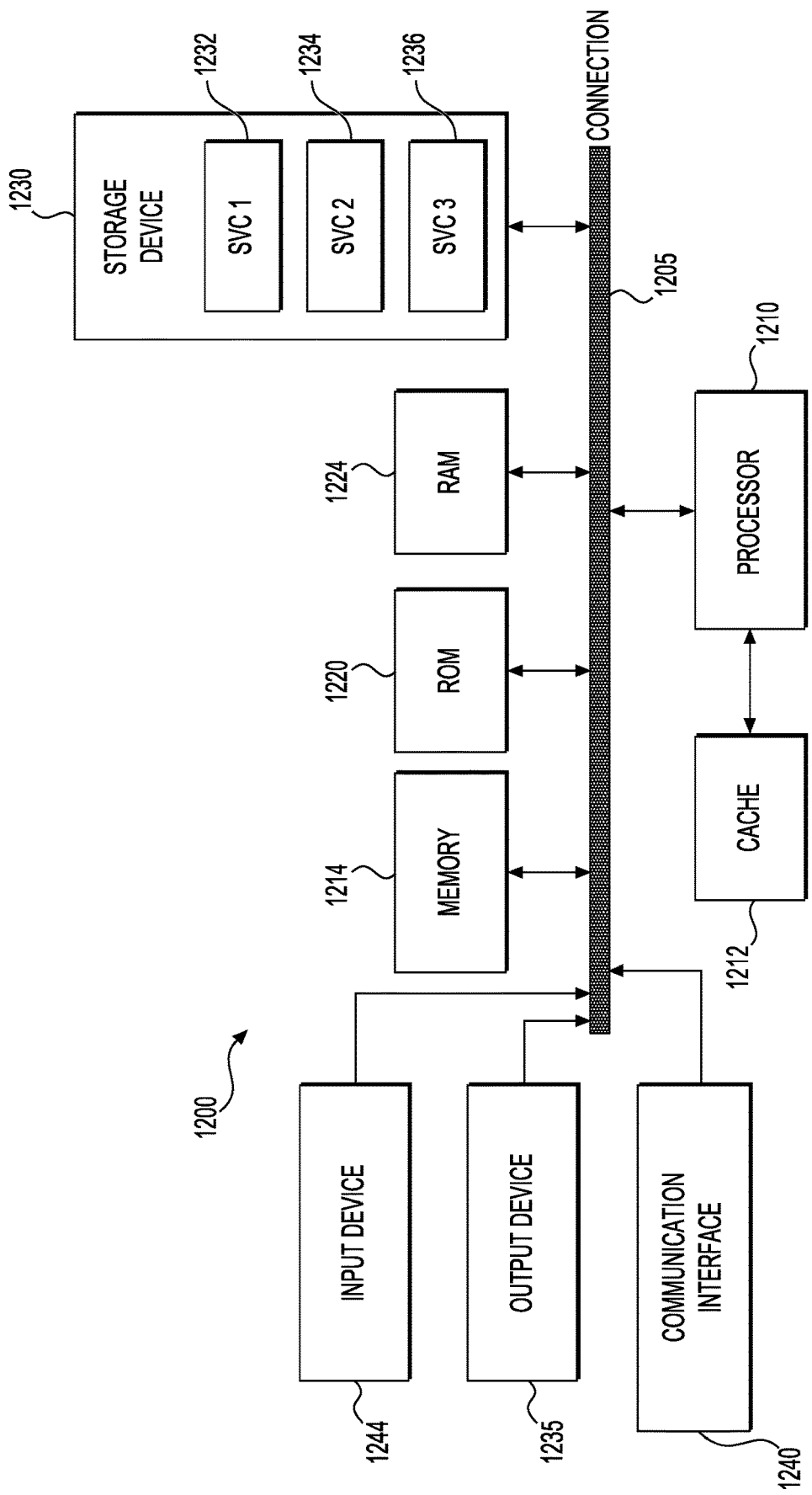
FIG. 12 illustrates an architecture of a computing system.

FIG. 12 illustrates an architecture of a computing system 1200 wherein the components of the system 1200 are in electrical communication with each other using a connection 1205, such as a bus. Exemplary system 1200 includes a processing unit (CPU or processor) 1210 and a system connection 1205 that couples various system components including the system memory 1214, such as read only memory (ROM) 1220 and random access memory (RAM) 1224, to the processor 1210. The system 1200 can include a cache of high-speed memory connected directly with, in close proximity to, or integrated as part of the processor 1210. The system 1200 can copy data from the memory 1214 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1214 may be available for use as well. The memory 1214 can include multiple different types of memory with different performance characteristics. The processor 1210 can include any general purpose processor and a hardware or software service, such as service 1 1232, service 2 1234, and service3 1236 stored in storage device 1230, configured to control the processor 1210 as well as a special-purpose processor where software instructions are incorporated into the actual processor design. The processor 1210 may be a completely self-contained computing system, containing multiple cores or processors, a bus, memory controller, cache, etc. A multi-core processor may be symmetric or asymmetric.

To enable client interaction with the computing system 1200, an input device 1244 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a client to provide multiple types of input to communicate with the computing system 1200. The communications interface 1240 can generally govern and manage the client input and system output. There is no restriction on operating on any particular hardware arrangement and therefore the basic features here may easily be substituted for improved hardware or firmware arrangements as they are developed. In some aspects, the communications interface may include a transceiver and at least one antenna, facilitating transmission and reception of data. The computing system 1200 may be implemented as part of a wireless device or network component (e.g., base station).

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1224, read only memory (ROM) 1220, and hybrids thereof.

The storage device 1230 can include services 1232, 1234, 1236 for controlling the processor 1210. Other hardware or software modules are contemplated. The storage device 1230 can be connected to the system connection 1205. In one aspect, a hardware module that performs a particular function can include the software component stored in a computer-readable medium in connection with the necessary hardware components, such as the processor 1210, connection 1205, output device 1235, and so forth, to carry out the function.

It is to be understood that the specific order or hierarchy of steps in the method(s) discussed and/or depicted throughout this disclosure are instances of example approaches and can be rearranged while remaining within the disclosed subject matter. For instance, any of the operations discussed and/or depicted throughout this disclosure may be omitted, repeated, performed in parallel, performed in a different order, and/or combined with any other of the operations discussed and/or depicted and throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method for wireless communication, comprising:
sending, by a wireless device, a first protocol data unit (PDU) session establishment request to a first network via an access network, the access network comprising a secure internet protocol (IP) session tunnel of a shared non-3GPP access node for receiving the first PDU session establishment request;
sending, by the wireless device, a second PDU session establishment request to a second network via the access network, the secure internet protocol (IP) session tunnel of a shared non-3GPP access node of the access network receiving the second PDU session establishment request;
receiving, via the access network, a first acknowledgement corresponding to the first PDU session establishment request; and
receiving, via the access network, a second acknowledgement corresponding to the second PDU session establishment request.

2. The method of claim 1, wherein the wireless device includes a plurality of subscriber identify modules (SIMs), wherein the first PDU session establishment request is based on a first SIM of the plurality of SIMs, and wherein the second PDU session establishment request is based on a second SIM of the plurality of SIMs.

3. The method of claim 1, wherein the access network is a non-cellular access network, a non-third-generation partnership project (3GPP) access network, a cellular access network, or a 3GPP access network.

4. The method of claim 1, wherein:
the first PDU session establishment request is sent to a first session management function (SMF) of the first network; and the second PDU session establishment request is sent to a second SMF of the second network.

5. The method of claim 1, wherein the first access network is part of the second network.

6. The method of claim 1, wherein the first access network is separate from the first network and the second network.

7. The method of claim 1, wherein the access network communicates with a gateway interface for PDU session establishment.

8. The method of claim 7, wherein the gateway interface is separate from the first network and the second network.

9. The method of claim 7, wherein the gateway interface is part of the second network.

10. A method for wireless communication, comprising:
receiving, from a wireless device, a first protocol data unit (PDU) session establishment request for establishing of a first PDU session with a first network via an access network, the access network comprising a secure internet protocol (IP) session tunnel of a shared non-3GPP access node for receiving the first PDU session establishment request;
receiving, from the wireless device, a second PDU session establishment request for establishing of a second PDU session with a second network via the access network, the secure internet protocol (IP) session tunnel of a shared non-3GPP access node of the access network receiving the second PDU session establishment request;
sending, via the access network and to the wireless device, a first acknowledgement corresponding to the first PDU session establishment request; and
sending, via the access network and to the wireless device, a second acknowledgement corresponding to the second PDU session establishment request.

11. The method of claim 10, wherein the access network is part of the second network.

12. The method of claim 10, wherein the access network is separate from the first network and the second network.

13. The method of claim 10, wherein the access network is a non-cellular access network, a non-third-generation partnership project (3GPP) access network, a cellular access network, or a 3GPP access network.

14. The method of claim 10, wherein the first PDU session establishment request and the second PDU session establishment request are received at a gateway interface.

15. The method of claim 14, wherein gateway interface is part of the second network.

16. A method for wireless communication, comprising:
receiving, at a first network and via a secure internet protocol (IP) session tunnel of a shared non-3GPP access node of the first network, a protocol data unit (PDU) session establishment request from a wireless device, wherein the PDU session establishment request indicates that an anchor network of the PDU session is a second network;
determining the second network in response to the anchor network being the second network;
sending, to the second network, a forwarded request associated with the PDU session establishment request;
receiving a response to the forwarded request from the second network; and
transmitting, to the wireless device, a response to the PDU session establishment request based on receiving the response to the forwarded request from the second network.

17. The method of claim 16, wherein the PDU session establishment request is received at a first session management function (SMF) component of the first network, and wherein the forwarded request is sent to a second SMF of the second network.

18. The method of claim 16, wherein indicating the anchor network is the second network includes indicating a public land and mobile network (PLMN) identifier of the second network.

19. The method of claim 16, wherein the anchor network is a primary session anchor user plane function (UPF) component.

20. The method of claim 16, wherein access traffic steering, switching and splitting (ATSSS) function is performed at the anchor network.

* * * * *